US012153376B2

(12) United States Patent
Watanabe et al.

(10) Patent No.: US 12,153,376 B2
(45) Date of Patent: Nov. 26, 2024

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Shuntaro Watanabe, Kanagawa (JP); Tomohito Ishida, Shizuoka (JP); Nobuhiro Nakamura, Shizuoka (JP); Hiroyuki Watanabe, Shizuoka (JP); Tatsuya Yamaai, Kanagawa (JP); Masatada Hirota, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/524,566

(22) Filed: Nov. 30, 2023

(65) Prior Publication Data

US 2024/0118634 A1 Apr. 11, 2024

Related U.S. Application Data

(63) Continuation of application No. PCT/JP2022/023268, filed on Jun. 9, 2022.

(30) Foreign Application Priority Data

Jun. 11, 2021 (JP) ................................ 2021-098347
Jun. 1, 2022 (JP) ................................ 2022-089699

(51) Int. Cl.
*G03G 5/047* (2006.01)
*G03G 5/147* (2006.01)
(Continued)

(52) U.S. Cl.
CPC ......... *G03G 5/047* (2013.01); *G03G 5/14747* (2013.01); *G03G 15/75* (2013.01);
(Continued)

(58) Field of Classification Search
CPC .... G03G 15/75; G03G 15/751; G03G 15/752; G03G 21/1839; G03G 5/047; G03G 5/14747; G03G 2221/183
See application file for complete search history.

(56) References Cited

U.S. PATENT DOCUMENTS 8,455,170 B2 6/2013 Nakamura et al.
9,029,054 B2 5/2015 Okuda et al.
(Continued)

FOREIGN PATENT DOCUMENTS

JP 2005-266036 A 9/2005
JP 2009-14915 A 1/2009
(Continued)

OTHER PUBLICATIONS

U.S. Appl. No. 18/489,936, Tatsuya Yamaai, filed Oct. 19, 2023.
(Continued)

*Primary Examiner* — Joseph S Wong
(74) *Attorney, Agent, or Firm* — VENABLE LLP

(57) ABSTRACT

The electrophotographic photosensitive member includes a support and a photosensitive layer on the support, in which a surface layer of the electrophotographic photosensitive member contains a particle, the surface layer has a particle partially exposed from the surface layer among the particle contained in the surface layer, the particle has a volume average particle diameter of 50.0 nm or more and 350.0 nm or less; in a cross-section of the surface layer, the number of the particle partially exposed from the surface layer is 80% by number or more based on a total number of the particle contained in the surface layer; and a total volume of an
(Continued)

exposed portion of the particle partially exposed from the surface layer is 30% by volume or more and 80% by volume or less based on an entire volume of the particle contained in the surface layer.

13 Claims, 4 Drawing Sheets

(51) Int. Cl.
*G03G 15/00* (2006.01)
*G03G 21/18* (2006.01)

(52) U.S. Cl.
CPC ......... *G03G 15/751* (2013.01); *G03G 15/752* (2013.01); *G03G 21/1839* (2013.01); *G03G 2221/183* (2013.01)

(56) References Cited

U.S. PATENT DOCUMENTS

| | | | |
|---|---|---|---|
| 9,040,214 B2 | 5/2015 | Fujii et al. | |
| 9,046,797 B2 | 6/2015 | Fujii et al. | |
| 9,063,505 B2 | 6/2015 | Sekiya et al. | |
| 9,069,267 B2 | 6/2015 | Kaku et al. | |
| 9,256,145 B2 | 2/2016 | Fujii et al. | |
| 9,304,416 B2 | 4/2016 | Noguchi et al. | |
| 9,372,417 B2 | 6/2016 | Fujii et al. | |
| 9,372,418 B2 | 6/2016 | Shida et al. | |
| 9,372,419 B2 | 6/2016 | Tsuji et al. | |
| 9,523,929 B2 | 12/2016 | Nakamura et al. | |
| 9,535,346 B2 | 1/2017 | Sekiya et al. | |
| 9,599,915 B2 | 3/2017 | Anezaki et al. | |
| 9,599,917 B2 | 3/2017 | Okuda et al. | |
| 9,726,992 B2 | 8/2017 | Sakuma et al. | |
| 10,073,362 B2 | 9/2018 | Fujii et al. | |
| 10,372,050 B2 | 8/2019 | Nishi et al. | |
| 10,416,581 B2 | 9/2019 | Ito et al. | |
| 10,452,021 B2 | 10/2019 | Miura et al. | |
| 10,539,892 B2 | 1/2020 | Nishida et al. | |
| 10,545,453 B2 | 1/2020 | Iwasaki et al. | |
| 10,558,132 B2 | 2/2020 | Ishiduka et al. | |
| 10,558,133 B2 | 2/2020 | Nakamura et al. | |
| 10,642,177 B2 | 5/2020 | Nakamura et al. | |
| 10,691,033 B2 | 6/2020 | Nishida et al. | |
| 10,747,130 B2 | 8/2020 | Okuda et al. | |
| 10,747,131 B2 | 8/2020 | Watanabe et al. | |
| 10,831,118 B2 | 11/2020 | Watanabe et al. | |
| 10,838,315 B2 | 11/2020 | Shimozawa et al. | |
| 11,003,102 B2 | 5/2021 | Ishiduka et al. | |
| 11,126,097 B2 | 9/2021 | Ishida et al. | |
| 11,181,837 B2 | 11/2021 | Sekiya et al. | |
| 11,237,493 B2 | 2/2022 | Makisumi et al. | |
| 11,249,407 B2 | 2/2022 | Watariguchi et al. | |
| 11,256,186 B2 | 2/2022 | Shimozawa et al. | |
| 11,366,402 B2 | 6/2022 | Ishiduka et al. | |
| 11,392,050 B2 | 7/2022 | Nishida et al. | |
| 11,392,074 B2 | 7/2022 | Ishida et al. | |
| 11,782,353 B2 | 10/2023 | Nakamura et al. | |
| 2014/0113225 A1 | 4/2014 | Yoshimura | |
| 2016/0154366 A1* | 6/2016 | Yamauchi .......... | G03G 5/14708<br>399/176 |
| 2020/0142344 A1 | 5/2020 | Ikeda | |
| 2021/0325794 A1 | 10/2021 | Iwasaki et al. | |
| 2021/0364937 A1* | 11/2021 | Kuno ..................... | G03G 5/047 |
| 2023/0058278 A1 | 2/2023 | Maruyama et al. | |
| 2023/0059041 A1 | 2/2023 | Kaku et al. | |
| 2023/0059773 A1 | 2/2023 | Yamaai et al. | |
| 2023/0115474 A1 | 4/2023 | Watanabe et al. | |
| 2023/0124743 A1* | 4/2023 | Nakamura ........... | G03G 5/1476<br>430/66 |
| 2023/0288836 A1 | 9/2023 | Iwasaki et al. | |
| 2024/0004322 A1 | 1/2024 | Makisumi et al. | |

FOREIGN PATENT DOCUMENTS

| | | |
|---|---|---|
| JP | 2009-145480 A | 7/2009 |
| JP | 2013-29812 A | 2/2013 |
| JP | 2016-118628 A | 6/2016 |
| JP | 2019-45862 A | 3/2019 |
| JP | 2020-71423 A | 5/2020 |

OTHER PUBLICATIONS

U.S. Appl. No. 18/525,277, Tomohito Ishida, filed Nov. 30, 2023.

"Refractive indices of solids" described on p. 517, vol. II of the Chemical Handbook, Basic Edition of the Revised 4th edition (Ed. Chemical Society of Japan, Maruzen Publishing Co., Ltd).

* cited by examiner

ELECTROPHOTOGRAPHIC PHOTOSENSITIVE MEMBER, PROCESS CARTRIDGE, AND ELECTROPHOTOGRAPHIC APPARATUS

CROSS-REFERENCE TO RELATED APPLICATIONS

This application is a Continuation of International Patent Application No. PCT/JP2022/023268, filed Jun. 9, 2022, which claims the benefit of Japanese Patent Application No. 2021-098347, filed Jun. 11, 2021 and Japanese Patent Application No. 2022-089699, filed Jun. 1, 2022 all of which are hereby incorporated by reference herein in their entirety.

BACKGROUND OF THE INVENTION

Field of the Invention

The present invention relates to an electrophotographic photosensitive member and a process cartridge and electrophotographic apparatus having the electrophotographic photosensitive member.

Description of the Related Art

In recent years, high-speed printing has been required in the field of an electrophotographic apparatus such as a copying machine and a printer to increase productivity. To achieve high speed in the electrophotographic apparatus, a latent image created in an exposure step must be developed into a toner in a developing step, and the toner must be transferred efficiently to a medium such as paper and an intermediate transfer medium in the repetition of charging, exposure, developing, and transfer steps of an electrophotographic process. From the viewpoint of effective use of space in an office, there has also been a growing demand for a small electrophotographic apparatus in which a cleaning step is omitted by improving the efficiency of the transfer step.

In the transfer step, a predetermined bias is applied to a toner in order to transfer the toner obtained by developing the latent image on a photosensitive member to the medium. By adding an external additive to the toner and forming a specific shape on the surface of the photosensitive member, the adhesiveness between the toner and the photosensitive member surface can be reduced, thereby decreasing the applied bias. This enables not only to save space in the electrophotographic apparatus for a high-voltage power supply to apply a high bias, but also to suppress toner scattering due to a high transfer bias, thereby achieving improvement of image quality. As one method of reducing the adhesion of toner to the surface of a photosensitive member by forming a specific shape on the surface of the photosensitive member, it has been conventionally proposed to form a convex shape on the surface of an electrophotographic photosensitive member by including particles to make a point contact between the toner and the surface of the photosensitive member.

Japanese Patent Application Laid-Open No. 2020-71423 discloses an electrophotographic photosensitive member having a convex structure on the surface of the outermost layer composed of a polymerizable monomer and a polymerization-cured product of a composition including an inorganic filler, for the purpose of improving cleaning performance and reducing wear on the photosensitive member and cleaning blade, regardless of the amount of lubricant supplied.

Japanese Patent Application Laid-Open No. 2019-45862 discloses an electrophotographic photosensitive member having a surface layer formed by curing a coating film containing organic resin particles, at least one of which are acrylic resin particles and melamine resin particles, and a hole transporting compound having a polymerizable functional group, for the purpose of making the photosensitive member surface wear-resistant and highly lubricious.

Japanese Patent Application Laid-Open No. 2016-118628 discloses an electrophotographic photosensitive member containing a curable resin and a polytetrafluoroethylene particle and having an irregular shape formed by mechanical polishing on the surface of a surface layer, for the purpose of reducing image unevenness caused by uneven gloss of the support while maintaining wear resistance.

Japanese Patent Application Laid-Open No. 2013-029812 discloses an electrophotographic photosensitive member containing encapsulated spherical particles that are encased in pores in a matrix component for the purpose of improving lubricity and cleanability of the photosensitive member surface.

Japanese Patent Application Laid-Open No. 2009-14915 discloses an electrophotographic photosensitive member in which independent concave portions of 0.1 μm or more and 10 μm or less in depth are formed on the surface of the surface layer of the photosensitive member for the purpose of maintaining a mold release effect, and a mold release material is contained within the concave portions.

In recent electrophotographic apparatus, there is a demand for both increased efficiency of the transfer process to reduce waste toner for dealing with environmental concerns and higher image quality at higher output speeds. However, in Japanese Patent Application Laid-Open Nos. 2020-71423, 2019-45862, and 2016-118628, although the adhesiveness between the toner and the surface of the photosensitive member is reduced to some extent and the transferability of the toner is improved, it was found that the laser light scattering during exposure of the photosensitive member due to the multi-layer layering of the fine particles in the surface layer makes it impossible to maintain uniformity in the halftone image. Furthermore, in Japanese Patent Application Laid-Open No. 2013-029812, when there is a peripheral speed difference between the photosensitive member and the intermediate transfer medium or media in the transfer process, the encased spherical particles move, and the contact area between the toner and the surface of the photosensitive member increases, resulting in a phenomenon of reduced transferability. In the case of Japanese Patent Application Laid-Open No. 2009-14915, multiple mold release materials were contained within the concave shape, and point contact between the toner and the surface of the photosensitive member could not be maintained, making it difficult to maintain good transferability for a long period of time.

An object of the present invention is to provide a photosensitive member achieving both improvement in image quality and improvement in transferability of a halftone image by suppressing light scattering in a surface layer of the photosensitive member.

SUMMARY OF THE INVENTION

The above object is achieved by the present invention below.

Specifically, an electrophotographic photosensitive member according to the present invention including a support and a photosensitive layer on the support, in which a surface layer of the electrophotographic photosensitive member contains a particle, the surface layer has a particle partially exposed from the surface layer among the particle contained in the surface layer, the particle has a volume average particle diameter of 50.0 nm or more and 350.0 nm or less;

in a cross-section of the surface layer, the number of the particle partially exposed from the surface layer is 80% by number or more based on a total number of the particle contained in the surface layer; and a total volume of an exposed portion of the particle partially exposed from the surface layer is 30% by volume or more and 80% by volume or less based on an entire volume of the particle contained in the surface layer.

Further features of the present invention will become apparent from the following description of exemplary embodiments with reference to the attached drawings.

DESCRIPTION OF THE EMBODIMENTS

Figure 1:
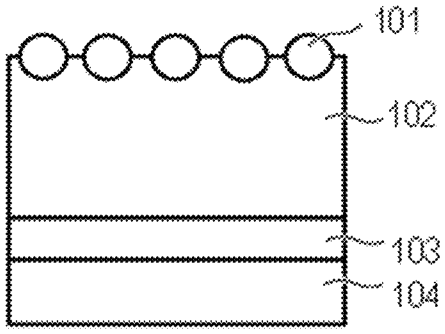
FIG. 1 is a conceptual view of each layer configuration in a cross-section of a photosensitive member.

Hereinafter, preferred embodiments of the present invention will be described.

Electrophotographic Photosensitive Member

The electrophotographic photosensitive member according to the present invention includes a support, a photosensitive layer provided on the support, and a surface layer containing a particle. The electrophotographic photosensitive member according to the present invention can be used as a cylindrical electrophotographic photosensitive member in which a photosensitive layer and a surface layer are formed on a cylindrical support, and can also be used in the form of a belt or a sheet.

The electrophotographic photosensitive member according to the present invention is used in an image forming method including a charging step of charging the surface of an electrophotographic photosensitive member, an exposure step of exposing the charged electrophotographic photosensitive member to form an electrostatic latent image, a developing step of supplying a toner to the electrophotographic photosensitive member having the electrostatic latent image formed thereon to form a toner image, and a transfer step of transferring the toner image formed on the electrophotographic photosensitive member.

A method for producing the electrophotographic photosensitive member according to the present invention includes a method of preparing coating liquids for respective layers to be described later; applying the coating liquids in a desired sequence of the layers; and drying the coating liquids applied. In this instance, examples of a method of applying each of the coating liquids include dip coating method, spray coating, inkjet coating, roll coating, die coating, blade coating, curtain coating, wire bar coating, and ring coating. Among these, dip coating is preferred from the viewpoints of efficiency and productivity.

The present invention provides an electrophotographic photosensitive member including a support and a photosensitive layer on the support, wherein a surface layer of the electrophotographic photosensitive member contains a particle, the surface layer has a particle partially exposed from the surface layer among the particle contained in the surface layer, and the electrophotographic photosensitive member satisfies the following three conditions:

(i) The particle has a volume average particle diameter of 50.0 nm or more and 350.0 nm or less.

(ii) In a cross-section of the surface layer, the number of the particle partially exposed from the surface layer is 80% by number or more based on a total number of the particle contained in the surface layer.

(iii) The total volume of an exposed portion of the particle partially exposed from the surface layer is 30% by volume or more and 80% by volume or less based on an entire volume of the particle contained in the surface layer.

Although the mechanism by which the problem is solved by the above configuration has not been clarified, the present inventors have speculated as follows.

To improve transferability in an electrophotographic apparatus, it is necessary to reduce the adhesiveness between the toner and the electrophotographic photosensitive member. Adhesion forces between the toner and the electrophotographic photosensitive member can be broadly classified into electrostatic and non-electrostatic adhesion forces. The electrostatic adhesion force is largely dependent on the amount of toner charge since the reflection force is the main factor. The magnitude of the reflection force is proportional to the amount of charge of the toner and inversely proportional to the square of the distance of the surface of the photosensitive member to which the toner adheres. From the viewpoint of ensuring the distance between the toner and the surface of the photosensitive member, particles are often arranged in the surface layer of the photosensitive member to attenuate the reflection force.

However, in order to arrange particles on the surface layer of a photosensitive member, conventional techniques often employ a configuration in which particles are mixed into the resin forming the surface layer to expose a partial number of particles with respect to the total number of particles. Therefore, it has been found that the amount of particles inside the surface layer of the photosensitive member is excessive, light scattering occurs in the surface layer of the photosensitive member in an exposure step of forming an electrostatic latent image in an electrophotographic apparatus, and the formation of a latent image in a halftone image becomes non-uniform.

In the electrophotographic photosensitive member of the present invention, in order to suppress light scattering, the surface layer of the photosensitive member needs to have a particle partially exposed from the surface layer among the particles contained in the surface layer. Moreover, in the cross-section of the surface layer, the number of the particle partially exposed from the surface layer needs to be 80% by number or more based on the total number of the particles contained in the surface layer. As a result, light scattering is suppressed, and the reproducibility of the latent image is improved. When the number of the particle partially exposed is less than 80% by number based on the total number of the particle contained in the surface layer, the uniformity of the halftone image is deteriorated. The number of the particle is more preferably 85% by number or more, even more preferably 90% by number or more. Here, the particle contained in the surface layer refer to a particle partially exposed from the surface layer and a particle having no portion exposed from the surface layer.

In conjunction, to reduce the aforementioned non-electrostatic adhesion force, it is necessary to also reduce the van der Waals force. To reduce the van der Waals force, it is effective to geometrically reduce the contact area between the toner and the electrophotographic photosensitive member. In this case, the particle contained in the surface layer of the electrophotographic photosensitive member according to the present invention preferably needs to have a volume average particle diameter of 50.0 nm or more and 350.0 nm or less. It is conceivable that the curvature of the partially exposed particle in the surface layer of the photosensitive member increases by using a particle with this volume average particle diameter, thereby maximally reducing the van der Waals force on the surface curvature of the toner. The volume average particle diameter is more preferably 70.0 nm or more and 250.0 nm or less, even more preferably 90.0 nm or more and 200.0 nm or less.

Furthermore, the particle size distribution is preferably within a certain range since the effect of reducing the adhesiveness between the photosensitive member and the toner varies as the variation in particle size distribution increases. Note that in the present invention, the volume average particle diameter and number average particle diameter of the particles are measured with an apparatus capable of measuring particle diameter by dynamic light scattering. The (volume average particle diameter)/(number average particle diameter), which is obtained by dividing the volume average particle diameter of the particle by the number average particle diameter, is preferably 1.5 or less, more preferably 1.4 or less, and even more preferably 1.3 or less.

Figure 6:
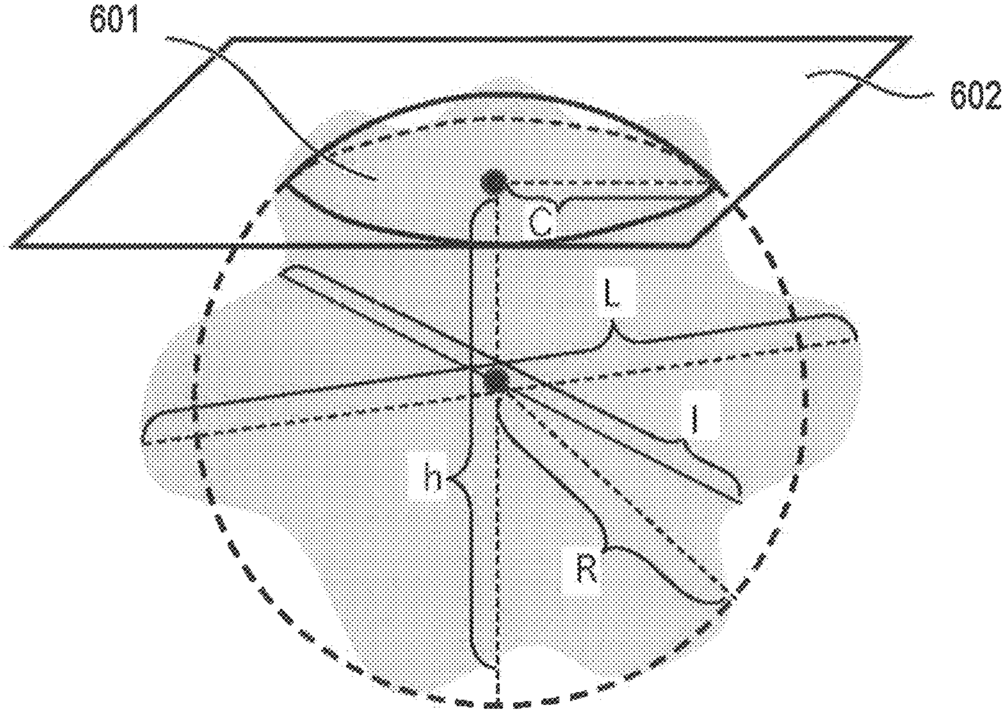
FIG. 6 is a conceptual view illustrating an exposed volume of a particle in a surface layer of a photosensitive member.

In order to achieve a higher level of reduction of light scattering in the exposure step while reducing the non-electrostatic adhesive force with the toner, it is necessary to use an electrophotographic photosensitive member in which the total volume of the exposed portion of the particle partially exposed from the surface layer is 30% by volume or more and 80% by volume or less based on the total volume of the particle contained in the surface layer. If it exceeds 80% by volume, the exposed volume of the particle becomes too large, and particle tend to come off from the surface layer of the photosensitive member due to repeated rubbing of the toner in the developing step. Furthermore, when the total volume of the exposed portion of the particle partially exposed from the surface layer is less than 30% by volume based on the total volume of the particle contained in the surface layer, the contact area becomes large, resulting in deterioration of transferability as well as decreased uniformity of the halftone image. For this reason, the total volume of an exposed portion of the particle partially exposed from the surface layer needs to be 30% by volume or more and 80% by volume or less based on an entire volume of the particle contained in the surface layer and is more preferably 35% by volume or more and 77.5% by volume or less, even more preferably 37.5% by volume or more and 75.0% by volume or less. The exposed portion of the particle partially exposed from the surface layer may be coated with a resin or a surface treating agent in advance. As shown in FIG. 6, the volume of the exposed portion of the particle partially exposed from the surface layer refers to the volume of the portion where particle contained in the binder resin of the surface layer are exposed from the surface of the resin portion of the surface layer.

The particle contained in the surface layer of the electrophotographic photosensitive member according to the present invention is not particularly limited. Examples of the particle include an organic resin particle such as an acrylic resin particle, an inorganic particle such as alumina, silica, and titania, and an organic-inorganic hybrid particle.

In addition, for the purpose of improving the charge transporting ability of the surface layer, electroconductive particles or charge transporting materials may be added to the coating liquid for a surface layer. As the electroconductive particle, an electroconductive pigment used in an electroconductive layer to be described later can be used. As the charge transporting substance, a charge transporting substance to be described later can be used. For the purpose of improving various functions, an additive can also be added. Examples of the additive include an electroconductive particle, an antioxidant, a UV absorber, a plasticizer, and a leveling agent.

Examples of the organic resin particle include a crosslinked polystyrene particle, a crosslinked acrylic resin particle, a phenol resin particle, a melamine resin particle, a polyethylene particle, a polypropylene particle, an acrylic resin particle, a polytetrafluoroethylene particle, and a silicone particle.

The acrylic resin particle contains a polymer of an acrylic ester or a methacrylic ester. A styrene-acrylic resin particle is more preferred of such particles. The degree of polymerization of the acrylic resin, styrene-acrylic resin and whether the resin is thermoplastic or thermosetting are not particularly limited.

The polytetrafluoroethylene particle may be a particle mainly composed of a tetrafluoroethylene resin and may further contain a trifluorochloroethylene resin, a hexafluoropropylene resin, a vinyl fluoride resin, a vinylidene fluoride resin, difluorodichloroethylene resin, or the like.

The organic-inorganic hybrid particle include a polymethylsilsesquioxane particle containing a siloxane bond.

As the particle contained in the surface layer of the electrophotographic photosensitive member according to the present invention, it is preferable to use an inorganic particle that has low elasticity and is advantageous in point contact with a toner.

The inorganic particle includes a particle of, for example, magnesium oxide, zinc oxide, lead oxide, tin oxide, tantalum oxide, indium oxide, bismuth oxide, yttrium oxide, cobalt oxide, copper oxide, manganese oxide, selenium oxide, iron oxide, zirconium oxide, germanium oxide, titanium oxide, niobium oxide, molybdenum oxide, vanadium oxide, copper aluminum oxide, tin oxide doped with antimony ions, and hydrotalcite. These particles may be used alone or in combination of two or more. The inorganic particle is preferably a silica particle.

A known silica particle can be used as the silica particle, which can be a dry silica particle or a wet silica particle.

More preferably, the silica particle is a wet silica particle obtained by a sol-gel method (hereinafter, also referred to as “sol-gel silica”).

The sol-gel silica used for the particle contained in the surface layer of the electrophotographic photosensitive according to the present invention may be either hydrophilic or hydrophobically treated on the surface of the particle.

Examples of the hydrophobic treatment method include a method of removing a solvent from a silica sol suspension, drying, and then treating with a hydrophobizing agent in the sol-gel method, and a method of adding a hydrophobizing agent directly to the silica sol suspension and treating simultaneously with drying. From the viewpoint of controlling the half-width of the particle size distribution and controlling the saturated water adsorption amount, the technique of adding the hydrophobizing agent directly to the silica sol suspension is preferred.

By the hydrophobization treatment of particles contained in the surface layer of the electrophotographic photosensitive member according to the present invention, the exposure state of the particles in the surface layer can be controlled.

Examples of the hydrophobizing agent include the following:

chlorosilanes, such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes, such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dim ethyl diethoxy silane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and -(2-aminoethyl)aminopropylmethyldimethoxysilane; silazanes, such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils, such as dimethyl silicone oil, methyl hydrogen silicone oil, methyl phenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal-reactive silicone oil;

siloxanes, such as hexamethylcyclotrisiloxane, octamethylcyclotetrasiloxane, decamethylcyclopentasiloxane, hexamethyldisiloxane, and octamethyltrisiloxane; and fatty acids and metal salts thereof including long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, and arachidonic acid, and salts of the fatty acids with metals such as zinc, iron, magnesium, aluminum, calcium, sodium, and lithium.

Among them, alkoxysilanes, silazanes, and silicone oils are preferably used because hydrophobization is easily performed. Such hydrophobizing agents may be used alone or in combination of two or more.

The particle contained in the surface layer of the electrophotographic photosensitive member according to the present invention preferably has a Young’s modulus of 0.60 GPa or more. When the Young’s modulus of the surface of the particle is less than 0.60 GPa, a contact area between the surface of the toner and the surface of the particle at the time of contact with the toner becomes large, resulting in deterioration of transferability.

Figure 4:
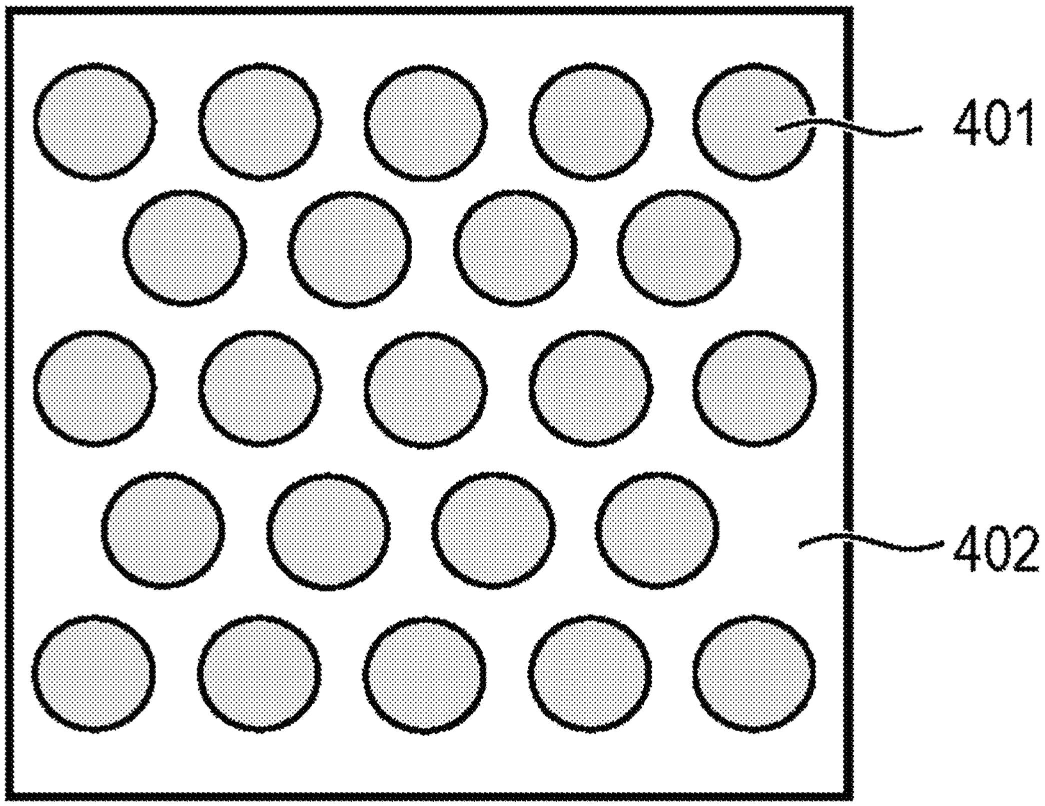
FIG. 4 is a conceptual view of an exposed area of a particle when a photosensitive member is viewed from the top.

In the electrophotographic photosensitive member according to the present invention, when the surface layer is viewed from above, S1/(S1+S2) (hereinafter also referred to as “coverage”) preferably satisfies the following formula (A), where S1 is the total area of the exposed portion 401 of the particle, and S2 is a total area other than the exposed portion 402 of the particle partially exposed from the surface layer, as shown in FIG. 4:

$$0.15 \leq S1/(S1+S2) \leq 0.80 \quad \text{Formula (A)}$$

When the coverage is less than 0.15, a contact area between the surface of the toner and a portion other than the exposed portion of the particle in the surface of the photosensitive member becomes large, and the adhesiveness increases, resulting in deterioration of transferability. When the coverage exceeds 0.80, the exposed portion of the particle in the surface of the photosensitive member increases, and thus the distances between contact sites of the toner and the particle contained in the surface layer of the photosensitive member tend to become shorter. As a result, the contact area between the toner and the particle contained in the surface layer of the photosensitive member becomes large, the adhesiveness increases, the transferability deteriorates, and the adhesion amount of the toner increases during durability testing of the electrophotographic photosensitive member. Therefore, the developability deteriorates, resulting in decrease in the density. The coverage is more preferably in a range of 0.20 or more and 0.70 or less, even more preferably in a range of 0.25 or more and 0.60 or less.

In addition, the coefficient of variation of the coverage S1/(S1+S2) is preferably 25% or less. If the coefficient of variation exceeds 25%, unevenness occurs in the state of point contact, resulting in deterioration of transferability. The coefficient of variation is more preferably 20% or less, even more preferably 15% or less.

In the electrophotographic photosensitive member according to the present invention, when the surface layer is viewed from above, an average circularity of a shape of the exposed portion of the particle is preferably 0.90 or more. If the average circularity is less than 0.90, point contact between the toner and the surface layer of the electrophotographic photosensitive member becomes difficult, and the transferability deteriorates, resulting in deterioration of dot scattering on an image. The average circularity of a shape of the exposed portion of the particle is more preferably 0.92 or more, even more preferably 0.94 or more.

In the electrophotographic photosensitive member according to the present invention, when the surface layer is viewed from above, SF-2 of a shape of the exposed portion of the particle to be described later is preferably 135 or less. If the SF-2 exceeds 135, point contact between the toner and the surface layer of the electrophotographic photosensitive member becomes difficult, and the transferability deteriorates, resulting in deterioration of dot scattering on an image.

In the electrophotographic photosensitive member according to the present invention, an ash content of insoluble methyl ethyl ketone in the surface layer during sintering is preferably 5.0% by mass or less based on a total mass of the surface layer. If the MEK insoluble content exceeds 5.0% by mass, light scattering on the surface of the photosensitive member increases, which is likely to deteriorate the evaluation of roughness of the halftone image. The MEK insoluble content is more preferably 4.5% by mass or less.

The electrophotographic photosensitive member according to the present invention may have several layer configurations.

Layer configuration 1: An electrophotographic photosensitive member including a support 104 and a photosensitive layer on the support, in which a surface layer of the electrophotographic photosensitive member contains particle 101, and the photosensitive layer has a charge generating layer 103 and a charge transport layer 102 on the charge generating layer, the charge transport layer being the surface layer (FIG. 1).

Figure 2:
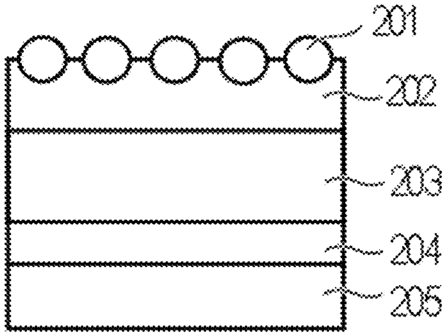
FIG. 2 is a conceptual view of each layer configuration in a cross-section of a photosensitive member.

Layer configuration 2: An electrophotographic photosensitive member including a support 205 and a photosensitive layer on the support, in which a surface layer of the electrophotographic photosensitive member contains particle 201, the photosensitive layer has a charge generating layer 204 and a charge transport layer 203 on the charge generating layer, and the electrophotographic photosensitive member further includes a protective layer 202 on the photosensitive layer, the protective layer being the surface layer (FIG. 2).

Figure 3:
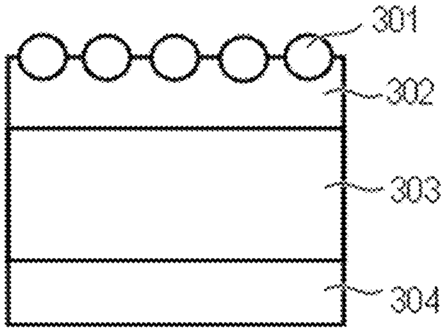
FIG. 3 is a conceptual view of each layer configuration in a cross-section of a photosensitive member.

Layer configuration 3: An electrophotographic photosensitive member including a support 304 and a photosensitive layer on the support, in which a surface layer of the electrophotographic photosensitive member contains particle 301, the photosensitive layer is a monolayered photosensitive layer 303, and the electrophotographic photosensitive member further includes a protective layer 302 on the photosensitive layer, the protective layer being the surface layer (FIG. 3).

In order to achieve both high transferability and high quality of the halftone image, the layer configuration 1 or the layer configuration 2 is preferred from the viewpoint of easily controlling the arrangement of particle in the surface layer, and the layer configuration 1 is more preferred.

Hereinafter, the respective layers will be described.

<Support>

The electrophotographic photosensitive member according to the present invention includes a support. In the present invention, the support is preferably an electroconductive support having electroconductivity. Examples of a shape of the support include a cylindrical shape, a belt shape, and a sheet shape. Among them, a cylindrical support is preferred. The surface of the support may be subjected to electrochemical treatment such as anodic oxidation, blasting treatment, and cutting treatment.

A material of the support is preferably a metal, a resin, a glass, or the like.

Examples of the metal include aluminum, iron, nickel, copper, gold, stainless steel, and an alloy thereof. Among them, an aluminum support made of aluminum is preferred.

In addition, the resin or glass may be mixed or coated with an electroconductive material, or the like, thereby imparting electroconductivity.

<Photosensitive Layer>

The photosensitive layer of the electrophotographic photosensitive member is mainly classified into (1) a laminated photosensitive layer and (2) a monolayered photosensitive layer. (1) The laminated photosensitive layer has a charge generating layer containing a charge generating substance and a charge transport layer containing a charge transporting substance. (2) The monolayered photosensitive layer has a photosensitive layer containing both a charge generating substance and a charge transporting substance.

(1) Laminated Photosensitive Layer

The laminated photosensitive layer has a charge generating layer and a charge transport layer.

(1-1) Charge Generating Layer

The charge generating layer preferably contains a charge generating substance and a resin.

Examples of the charge generating substance include an azo pigment, a perylene pigment, a polycyclic quinone pigment, an indigo pigment, and a phthalocyanine pigment. Of these, the azo pigment and the phthalocyanine pigment are preferred. Of such phthalocyanine pigments, an oxytitanium phthalocyanine pigment and a chlorogallium phthalocyanine pigment, and a hydroxygallium phthalocyanine pigment are preferred.

The content of the charge generating substance in the charge generating layer is preferably 40% by mass or more and 85% by mass or less, more preferably 60% by mass or more and 80% by mass or less based on the total mass of the charge generating layer.

Examples of the resin include a polyester resin, a polycarbonate resin, a polyvinyl acetal resin, polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of these, the polyvinyl butyral resin is more preferred.

The charge generating layer may further contain an additive, such as an antioxidant and a UV absorber. Specific examples thereof include a hindered phenol compound, a hindered amine compound, a sulfur compound, a phosphorus compound, and a benzophenone compound.

The average film thickness of the charge generating layer is preferably 0.1 μm or more and 1 μm or less, and more preferably 0.15 μm or more and 0.4 μm or less.

The charge generating layer can be formed by preparing a coating liquid for a charge generating layer containing the respective materials described above and a solvent to form a coat of the coating liquid and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge Transport Layer

The charge transport layer preferably contains a charge transporting substance and a binder resin.

Examples of the charge transporting substance include a polycyclic aromatic compound, a heterocyclic compound, a hydrazone compound, a styryl compound, an enamine compound, a benzidine compound, a triarylamine compound, a resin having a group derived from each of these substances. Of these, the triarylamine compound and the benzidine compound are preferred, and a compound having the following structure is suitably used (1)
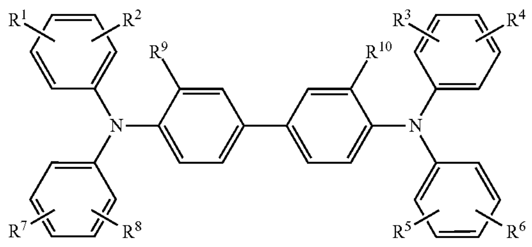
(In the formula (1), R1 to R10 each independently represent a hydrogen atom or a methyl group.)
Examples of the structure represented by the formula (1) are shown in formulas (1-1) to (1-10). Among them, the structure represented by each of the formulas (1-1) to (1-6) is more preferred.
(1-1)
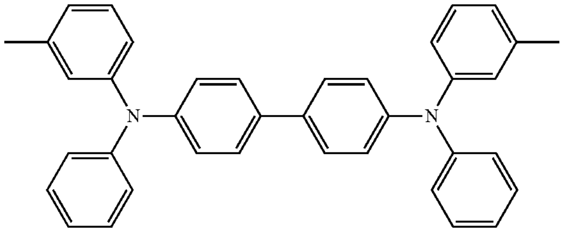
(1-2)
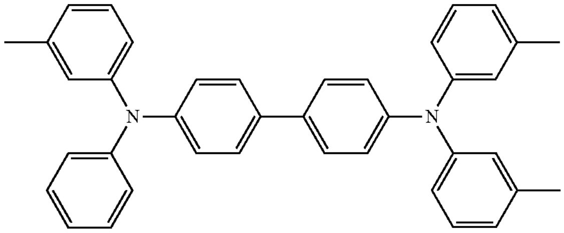
(1-3)
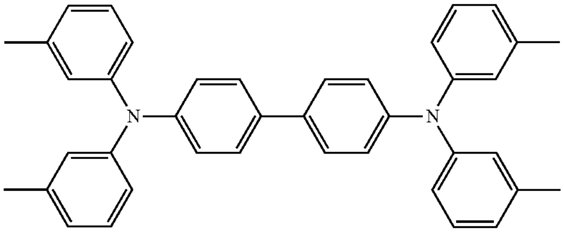
(1-4)
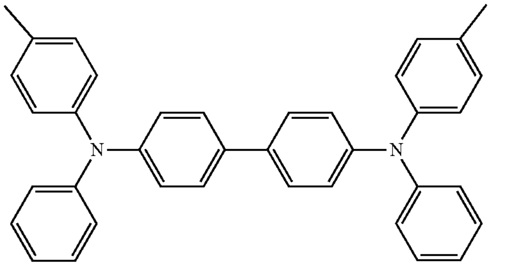
-continued
(1-5)
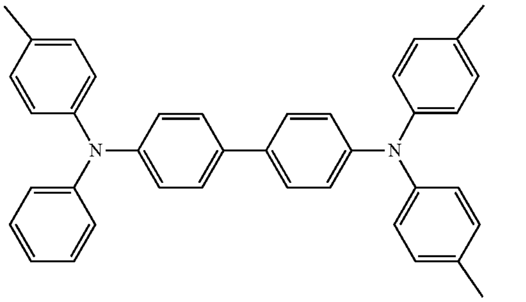
(1-6)
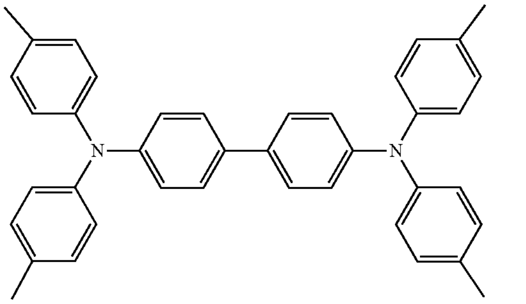
(1-7)
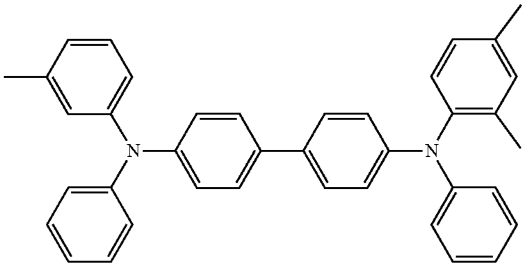
(1-8)
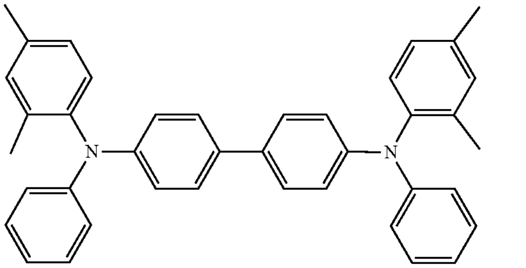
(1-9)
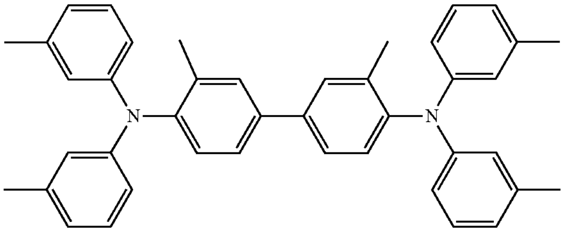

-continued (1-10)

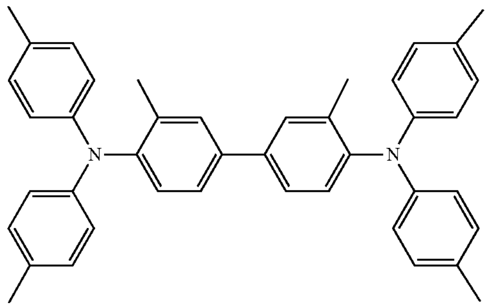

A thermoplastic resin is used as the binder resin, and examples thereof include a polyester resin, a polycarbonate resin, an acrylic resin, and a polystyrene resin. Among them, the polycarbonate resin and the polyester resin are preferred. The polyester resin is particularly preferably a polyacrylate resin.

The content of the charge transporting substance in the charge transport layer is preferably 25% by mass or more and 70% by mass or less, more preferably 30% by mass or more and 55% by mass or less based on the total mass of the charge transport layer.

A content ratio (mass ratio) of the charge transporting substance to the binder resin is preferably 4/10 to 20/10, more preferably 5/10 to 12/10.

In addition, the charge transport layer may contain an additive, such as an antioxidant, a UV absorber, a plasticizer, a leveling agent, a sliding property-imparting agent, and a wear resistance-improving agent. Specific examples thereof include a hindered phenol compound, a hindered amine compound, a sulfur compound, a phosphorus compound, a benzophenone compound, a siloxane-modified resin, a silicone oil, a fluorine resin particle, a polystyrene resin particle, a polyethylene resin particle, a silica particle, an alumina particle, and a boron nitride particle.

The average film thickness of the charge transport layer is preferably 5 μm or more and 50 μm or less, more preferably 8 μm or more and 40 μm or less, and particularly preferably 10 μm or more and 30 μm or less.

The charge transport layer can be formed by preparing a coating liquid for a charge transport layer containing the respective materials described above and a solvent to form a coat of the coating liquid and drying the coat. Examples of the solvent to be used for the coating liquid include an alcohol-based solvent, a ketone-based solvent, an ether-based solvent, an ester-based solvent, and an aromatic hydrocarbon-based solvent. Of these solvents, the ether-based solvent or aromatic hydrocarbon-based solvent is preferred.

In a case where the charge transport layer is a surface layer, the particle according to the present invention is contained in the surface of the charge transport layer.

(2) Monolayered Photosensitive Layer

The monolayered photosensitive layer can be formed by preparing a coating liquid for a photosensitive layer containing a charge generating substance, a charge transporting substance, a binder resin, and a solvent to form a coat of the coating liquid and drying the coat. The same materials as the examples of the materials in "(1) Laminated Photosensitive Layer" are used as the charge generating substance, the charge transporting substance, and the resin.

<Protective Layer>

In the present invention, a protective layer may be provided on the photosensitive layer. Durability may be improved by providing the protective layer.

The protective layer preferably contains an electroconductive particle and/or a charge transporting substance and a binder resin.

The electroconductive particle includes a metal oxide particle such as a titanium oxide particle, a zinc oxide particle, a tin oxide particle, and an indium oxide particles. Examples of the charge transporting substance include a polycyclic aromatic compound, a heterocyclic compound, a hydrazone compound, a styryl compound, an enamine compound, a benzidine compound, a triarylamine compound, a resin having a group derived from each of these substances. Of these, the triarylamine compound and the benzidine compound are preferred.

Examples of the binder resin include a polyester resin, an acrylic resin, a phenoxy resin, a polycarbonate resin, a polystyrene resin, a phenol resin, a melamine resin, and an epoxy resin. Among them, the polycarbonate resin, the polyester resin, and the acrylic resin are preferred. In addition, the protective layer may be formed as a cured film by polymerizing a composition containing a monomer having a polymerizable functional group. Examples of a reaction in this case include a thermal polymerization reaction, a photopolymerization reaction, and a radiation polymerization reaction. Examples of the polymerizable functional group of the monomer having a polymerizable functional group include an acryl group and a methacryl group. As the monomer having a polymerizable functional group, a material having a charge transporting ability may also be used.

A compound having a polymerizable functional group may have a charge transporting structure as well as a chain-polymerizable functional group. The charge transporting structure is preferably a triarylamine structure in terms of charge transportation. The chain-polymerizable functional group is preferably an acryloyl group or a methacryloyl group. The number of polymerizable functional groups may be one or more. A case in which the cured film is formed by incorporating a compound having a plurality of polymerizable functional groups and a compound having one polymerizable functional group out of such compounds is particularly preferred since distortion caused by the polymerization of a plurality of the polymerizable functional groups is easily eliminated.

Examples of the compound having one polymerizable functional group are shown in formulas (2-1) to (2-6).

(2-1)

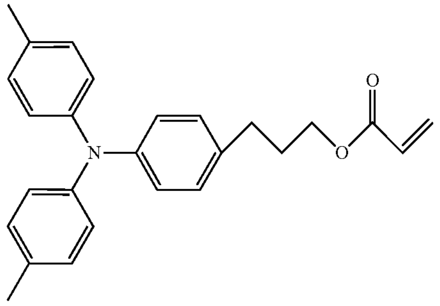

-continued
(2-2)
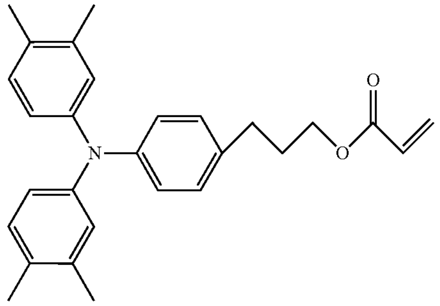
(2-3)
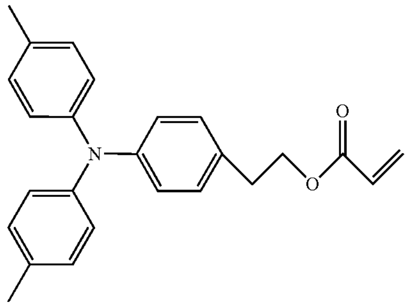
(2-4)
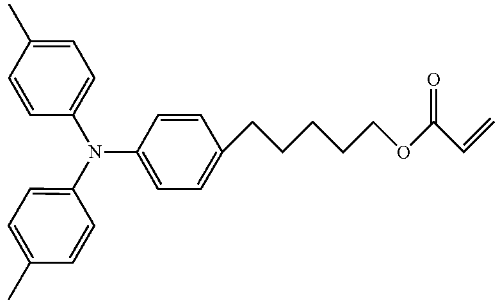
-continued
(2-5)
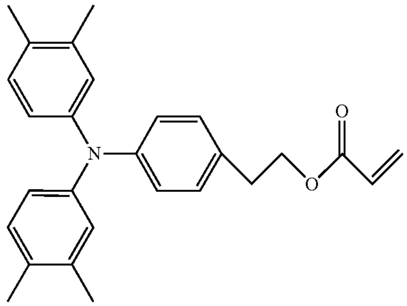
(2-6)
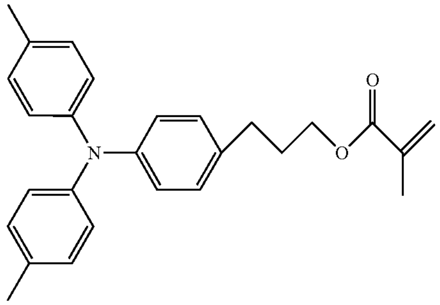
Examples of the compound having a plurality of the polymerizable functional groups are shown in formulas (3-1) to (3-7).
(3-1)
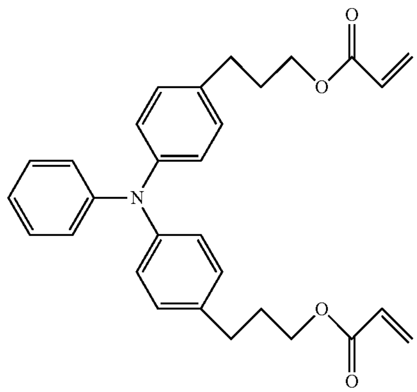
(3-2)
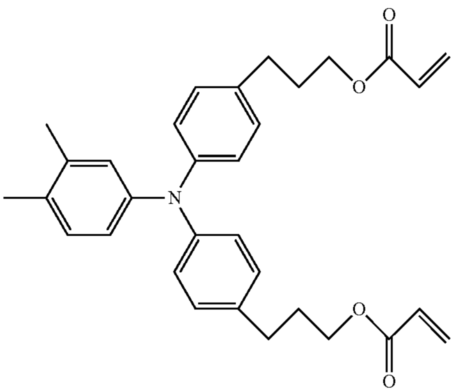

-continued (3-3)

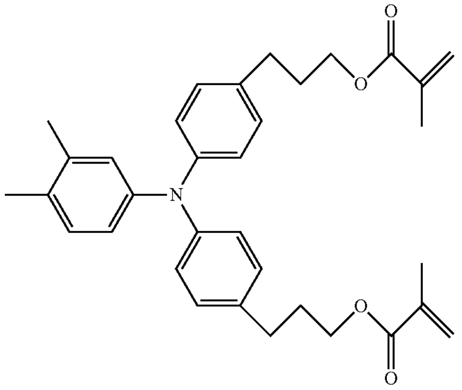

(3-4)

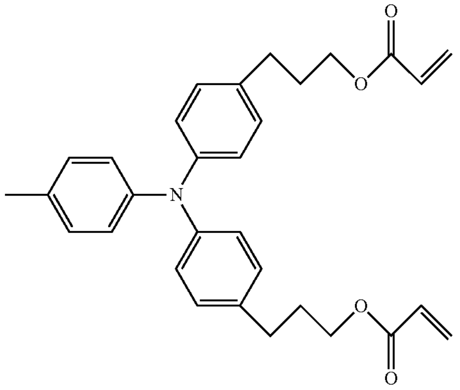

(3-5)

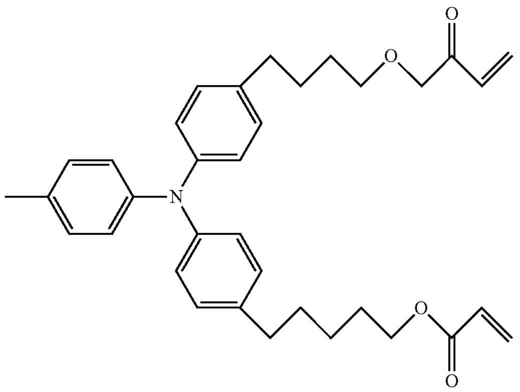

(3-6)

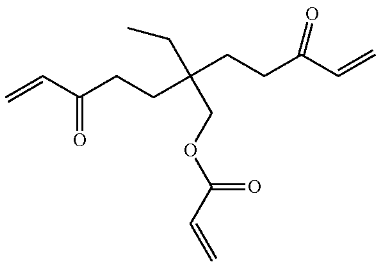

(3-7)

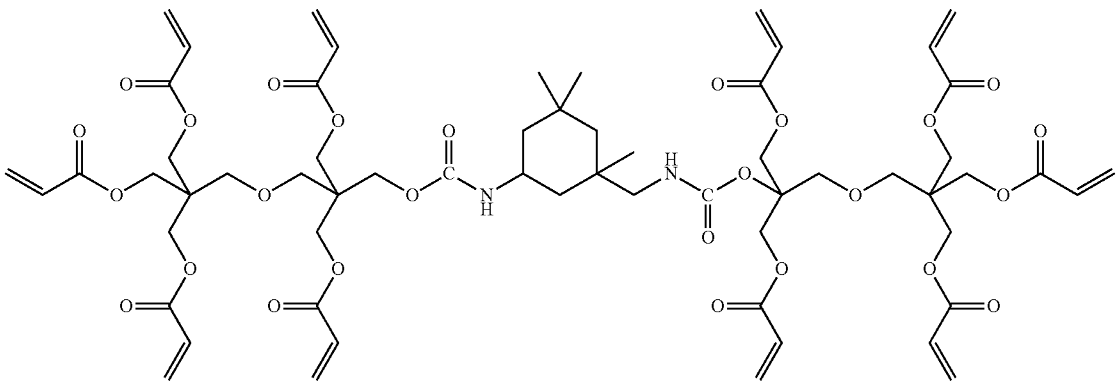

The protective layer may also contain an additive, such as an antioxidant, a UV absorber, a plasticizer, a leveling agent, a sliding property-imparting agent, and a wear resistance-improving agent. Specific examples thereof include a hindered phenol compound, a hindered amine compound, a sulfur compound, a phosphorus compound, a benzophenone compound, a siloxane-modified resin, a silicone oil, a fluorine resin particle, a polystyrene resin particle, a polyethylene resin particle, a silica particle, an alumina particle, and a boron nitride particle.

The protective layer can be formed by preparing a coating liquid for a protective layer containing the respective materials described above and a solvent to form a coat of the coating liquid and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

In a case where the protective layer is a surface layer, the particle according to the present invention is contained in the surface of the protective layer.

Furthermore, the proportion of the volume of the particle to the total volume of the protective layer is preferably 20% by volume to 80% by volume. The proportion is more preferably 25% by volume to 75% by volume, even more preferably 35% by volume to 70% by volume.

<Electroconductive Layer>

The electrophotographic photosensitive member according to the present invention may be provided with an electroconductive layer on a support. This arrangement of the electroconductive layer can conceal flaws and irregularities in the surface of the support, and control the reflection of light on the surface of the support. The electroconductive layer preferably contains an electroconductive particle and a resin. Examples of a material of the electroconductive layer particle include a metal oxide, a metal, and carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of these, the metal oxide is preferably used as the electroconductive particle, and in particular, the titanium oxide, the tin oxide, and the zinc oxide are more preferably used.

When the metal oxide is used as the electroconductive particle, the surface of the metal oxide may be treated with a silane coupling agent or the like, or the metal oxide may be doped with an element, such as phosphorus and aluminum, or an oxide thereof.

In addition, each electroconductive particle may be of a layered configuration having a core particle and a coating layer coating the particle. Examples of the core particle include titanium oxide, barium sulfate, and zinc oxide. The coating layer include a metal oxide, such as tin oxide.

When the metal oxide is used as the electroconductive particle, the volume average particle diameter is preferably 1 nm or more and 500 nm or less, more preferably 3 nm or more and 400 nm or less Examples of the resin include a polyester resin, a polycarbonate resin, a polyvinyl acetal resin, an acrylic resin, a silicone resin, an epoxy resin melamine resin, a polyurethane resin, a phenol resin, and an alkyd resin.

The electroconductive layer may further contain a concealing agent, such as a silicone oil, a resin particle, or titanium oxide.

The average film thickness of the electroconductive layer is preferably 1 μm or more and 50 μm or less, particularly preferably 3 μm or more and 40 μm or less. The electroconductive layer can be formed by preparing a coating liquid for an electroconductive layer containing the respective materials described above and a solvent to form a coat of the coating liquid and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particle in the coating liquid for an electroconductive layer includes a method using a paint shaker, a sand mill, a ball mill, and a liquid collision-type high-speed disperser.

<Undercoat Layer>

The electrophotographic photosensitive member according to the present invention may be provided with an undercoat layer on the support or the electroconductive layer. This arrangement of the undercoat layer can improve an adhesive function between layers to impart a charge injection inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, melamine resin, a polyurethane resin, a phenol resin, a polyvinylphenol resin, an alkyd resin, a polyvinyl alcohol resin, a polyethylene oxide resin, a polypropylene oxide resin, a polyamide resin, a polyamic acid resin, a polyimide resin, a polyamideimide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In order to improve electric properties, the undercoat layer may further contain an electron transporting substance, a metal oxide, a metal, and an electroconductive polymer. Of these, the electron transporting substance and the metal oxide may be preferably used.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. The undercoat layer may also be formed as a cured film by using an electron transporting substance having a polymerizable functional group as the electron transporting substance and copolymerizing with the monomer having a polymerizable functional group described above.

Examples of the metal oxide include indium tin oxide, tin oxide, indium oxide, titanium oxide, zinc oxide, aluminum oxide, and silicon dioxide. Examples of the metal include gold, silver, and aluminum.

The undercoat layer may further contain an additive. The average thickness of the undercoat layer is preferably 0.1 μm or more and 50 μm or less, more preferably 0.2 μm or more and 40 μm or less, particularly preferably 0.3 μm or more and 30 μm or less.

The undercoat layer can be formed by preparing a coating liquid for an undercoat layer containing the respective materials described above and a solvent to form a coat of the coating liquid and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

[Process Cartridge and Electrophotographic Apparatus]

The process cartridge integrally supporting at least one step selected from the group consisting of a charging step, a developing step, and a transfer step can be equipped with the above-mentioned electrophotographic photosensitive member. The process cartridge has a feature of being removably mountable on a main body of the electrophotographic photosensitive apparatus.

Figure 5:
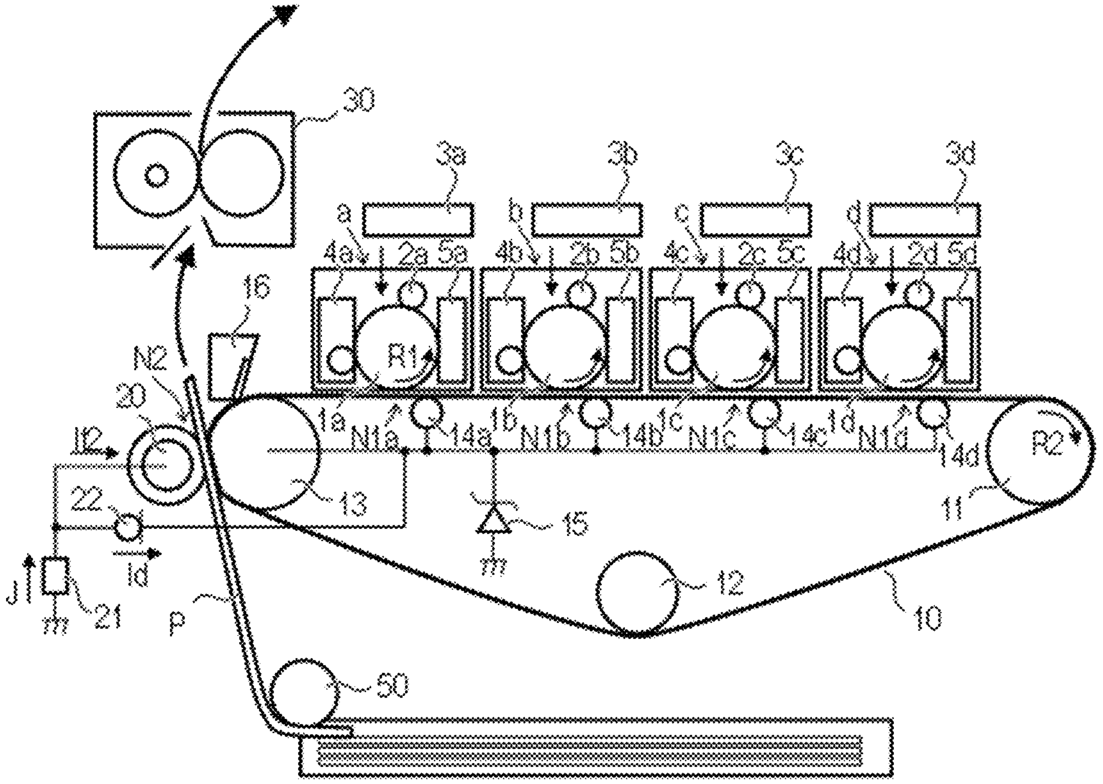
FIG. 5 is a conceptual view illustrating an electrophotographic apparatus.

FIG. 5 illustrates an example of a schematic configuration of an electrophotographic apparatus having a process cartridge with the electrophotographic photosensitive member according to the present invention.

[Configuration of Electrophotographic Apparatus]

The electrophotographic apparatus according to the present example is a so-called tandem type electrophotographic apparatus provided with a plurality of image forming sections "a" to "d". An image is formed with toner of various colors in which the first image forming section "a" forms an image with yellow (Y) toner, the second image forming section "b" with magenta (M) toner, the third image forming section "c" with cyan (C) toner, and the fourth image forming section "d" with black (Bk) toner. These four image forming sections are disposed in a line at constant intervals, and the image forming units are configured with many portions that are substantially the same except for the color of the toner. Accordingly, the electrophotographic apparatus of the present example will be described hereinafter using the first image forming section "a".

The first image forming section "a" includes a photosensitive drum 1*a* that is a drum-shaped photosensitive member, a charging roller 2*a* that is a charging member, a developing unit 4*a*, and a drum cleaning unit 5*a*.

The photosensitive drum 1*a* is an image bearing member that carries a toner image and is rotatably driven in a direction of an arrow R1 illustrated in the drawing at a predetermined circumferential speed (process speed). The developing unit 4*a* is an apparatus that stores yellow toner to develop a yellow toner image on the photosensitive drum 1*a*. The drum cleaning unit 5*a* is a unit for collecting the toner adhering to the photosensitive drum 1*a*. The drum cleaning unit 5*a* includes a cleaning blade that contacts the photosensitive drum 1*a* and a toner collection box that stores the toner or the like removed from the photosensitive drum 1*a* by the cleaning blade.

When a control unit (not shown) such as a controller receives an image signal, an image forming operation is started while the photosensitive drum 1*a* is rotatably driven. In the rotation process, the photosensitive drum 1*a* is uniformly charged by the charging roller 2*a* to have a predetermined voltage (charging voltage) with a predetermined polarity (negative polarity in the present example) and exposed by an exposure unit 3*a* according to the image signal. Through the above-mentioned operations, an electrostatic latent image that corresponds to an image of a yellow color component in the intended color image is formed. Subsequently, the electrostatic latent image is developed by the developing unit 4*a* at the developing position and visualized on the photosensitive drum 1*a* as a yellow toner image. In this regard, a normal charge polarity of the toner accommodated in the developing unit 4*a* is a negative polarity, and the electrostatic latent image is developed in a reversed manner with toner charged by the charging roller 2*a* so as to have the same charge polarity with that of the photosensitive drum 1*a*. However, not limited to the above, the present invention can be applied to an electrophotographic apparatus that performs positive development of an electrostatic latent image with toner having been charged to have a polarity opposite to the charge polarity of the photosensitive drum 1*a*.

An endless and movable intermediate transfer belt 10 has electroconductivity, forms a primary transfer portion N1*a* by contacting the photosensitive drum 1*a*, and rotates at a circumferential speed that is substantially the same as that of the photosensitive drum 1*a*. Furthermore, the intermediate transfer belt 10 is stretched by a counter roller 13 serving as an opposing member, a driving roller 11 and a tension roller 12 each serving as a tension member, and a metal roller 14*a* and is stretched at a tension amounting to a total pressure of 60 N with the tension roller 12. The intermediate transfer belt 10 can be moved by rotatably driving the driving roller 11 in a direction of an arrow R2 illustrated in the drawing. In addition, each of the metal rollers 14 and the counter roller 13 is connected to ground through a Zener diode 15 as a constant voltage element.

In the course of passing through the primary transfer portion N1*a*, the yellow toner image formed on the photosensitive drum 1*a* is primarily transferred onto the intermediate transfer belt 10 from the photosensitive drum 1*a*. Primary transfer residual toner remaining on the surface of the photosensitive drum 1*a* is cleaned and removed by the drum cleaning unit 5*a*, and then used in the image forming process in the charging step and after.

During primary transfer, a current is fed to the electroconductive intermediate transfer belt 10 from a secondary transfer roller 20 serving as a secondary transfer member in contact with an outer peripheral surface of the intermediate transfer belt 10. When the current fed from the secondary transfer roller 20 flows in a circumferential direction of the intermediate transfer belt 10, the toner image is primarily transferred from the photosensitive drum 1*a* to the intermediate transfer belt 10. In so doing, a voltage having a predetermined polarity (positive polarity in the present example) that is opposite to the normal charge polarity of the toner is applied from a transfer power supply 21 to the secondary transfer roller 20.

Hereinafter, in the same manner, a toner image formed of a second color, magenta, a toner image formed of a third color, cyan, and a toner image formed of a fourth color, black, are formed and are transferred onto the intermediate transfer belt 10 in a sequential manner so as to overlap each other. Through the above-mentioned operations, a toner image including four colors corresponding to the intended color image is formed on the intermediate transfer belt 10. Thereafter, the four-colored toner image carried on the intermediate transfer belt 10 is secondarily transferred all at once onto a surface of a transfer material P, such as a sheet of paper or an OHP sheet, fed from a paper feeding unit 50, in the course of passing through a secondary transfer portion N2 formed by the secondary transfer roller 20 and the intermediate transfer belt 10 in contact with each other. The transfer material P on which the four-colored toner image has been secondarily transferred is, subsequently, heated and compressed at a fixing unit 30 so that the toner of four colors are melted and mixed and is fixed to the transfer material P. The toner remaining on the intermediate transfer belt 10 after the secondarily transfer is cleaned and removed by a belt cleaning unit 16 provided so as to oppose the counter roller 13 with the intermediate transfer belt 10 interposed therebetween. Moreover, a current path that does not connect with the secondary transfer roller 20 but electrically connects the transfer power supply 21 and the metal rollers 14 to each other through a constant current diode 22 serving as a constant current element is provided. When a voltage is applied to the secondary transfer roller 20 from the transfer power supply 21, other than an electric current It2 flowing towards the secondary transfer portion N2, a pinch-off current Id flows through the constant current diode 22.

The electrophotographic photosensitive member according to the present invention may be used in a laser beam printer, a LED printer, a copying machine, and the like.

[Evaluation Method of Electrophotographic Photosensitive Member]

An evaluation method in the present invention will be described.

<Method of Measuring Exposed Volume and Number of Particle in Surface Layer of Photosensitive Member>

The electrophotographic photosensitive member according to the present invention is cut into 5 mm squares at three points of 50 mm from each end and the center in the longitudinal direction, and four points at 90 degrees each in the circumferential direction, that is, at a total of 12 points, to obtain a sample. The photosensitive layer of the sample is coated with platinum for 30 seconds by an evaporator.

In a FIB-SEM (NVision40, manufactured by Carl Zeiss Co., Ltd.), the following cuts are made on each sample.

Beam type: gallium ion beam

Acceleration voltage: 1 kV

Size: 3 μm long, 3 μm wide, 3 μm deep

Length of machining step: 10 nm

Number of step: 300

In addition, SEM observation is performed at an acceleration voltage of 5 kV, a focal length WD of 5 mm, and a field of view of 30,000 times magnification for each step.

All images captured by the FIB-SEM are converted into three dimensional images in an image processing and analysis software ("ExfactVR2.1", manufactured by Nihon Visual Science, Inc.) via an interface. The number of particle exposed from the surface layer of the photosensitive member is measured from the three dimensional image, and a ratio of the number of exposed the particle to the total number of the particle contained in the surface layer is calculated.

Furthermore, the derived three dimensional image is compared with the image of the particle exposed from the surface layer cut by FIB-SEM, and a cross-sectional image of the particle whose centroids are cut is taken into an image processing and analyzing apparatus ("LUZEX AP", manufactured by NIRECO CORPORATION) through the interface to binarize the particle in the cross-sectional image. As shown in the conceptual view of FIG. 6, from the cross-section of the particle exposed from the surface layer of the photosensitive member, the particle in the surface layer was approximated to a spherical particle of a virtual true sphere having a radius R of the particle which is ½ of the sum of the major axis L and the minor axis 1 of the particle. The centroid of the cross-section of the particle exposed from the surface layer coincides with the centroid of the spherical particle of the virtual true sphere. For the particle exposed from the surface layer of the photosensitive member, the calculation is performed by approximating a surface layer 602 where a resin portion is exposed to a smooth surface with almost no undulation. The depth of a portion where the particle contained in the surface layer of the photosensitive member according to the present invention is buried from the surface layer 602 of the resin portion is defined as h.

In addition, the virtual true sphere is approximated to a circle having a radius C of the particle when the bottom surface of the portion exposed from the surface layer 602 of the resin portion is viewed from above (conceptual view is shown in FIG. 6).

The volume V of the exposed portion of the particle is calculated by the following formula (B):

$$V=4\pi R^3/3-\pi h(3C^2+h^2)/6 \qquad \text{Formula (B)}$$

The volume of the exposed portion of the particle in the three dimensional image is measured, the sum of the volume of the exposed portion of the particle partially exposed from the surface layer is calculated, and the sum is divided by the total volume of the particle contained in the surface layer to calculate the ratio of the volume of the exposed portion of the particle partially exposed from the surface layer.

<Method of Measuring Volume Average Particle Diameter of Particle of the Invention>

The volume average particle diameter is measured using a ZETASIZER NANO-ZS (Malvern Panalytical Ltd.). This apparatus measures particle diameter by the dynamic light scattering method. The sample to be measured is first prepared by being diluted to a solid-liquid ratio of 0.10% by mass (±0.02% by mass), collected in a quartz cell, and placed in the measurement part. Water or a methyl ethyl ketone/methanol mixed solvent is used as the dispersion medium when the sample is the inorganic fine particle, and water when the sample is the resin particle or external additive for toner. The refractive index of the sample and the refractive index, viscosity, and temperature of the dispersion solvent are input into the Zetasizer Software 6.30 control software as measurement conditions prior to measurement. The Dn is taken as the number average particle diameter.

The refractive index of the particle is taken from the "Refractive indices of solids" described on page 517, Vol. II of the Chemical Handbook, Basic Edition of the Revised 4th edition (Ed. Chemical Society of Japan, Maruzen Publishing Co., Ltd). For the refractive index of the resin particle, the refractive index stored in the control software is used as the refractive index of the resin used in the resin particle. However, if no refractive index is stored in the control software the value described in the polymer database of the National Institute for Materials Science is used. The refractive index of the external additive for toner is calculated by weight-averaging the refractive index of the inorganic fine particle and the refractive index of the resin used in the resin particle. The values stored in the control software are selected for the refractive index, viscosity and temperature of the dispersion solvent. In the case of a mixed solvent, the values of the mixed dispersion media are weight averaged.

<Method of Measuring Coverage and Coefficient of Variation of Particle in Surface Layer of Photosensitive Member>

In electrophotographic photosensitive member according to the present invention, when the surface layer is viewed from above, S1/(S1+S2) can be calculated as follows, where S1 is the total area of the exposed portions of the particle.

For the particle in the surface layer, a photographic image of the surface layer of the photosensitive member, taken at a magnification of 30,000 times using a scanning electron microscope (SEM) ("S-4800", manufactured by JEOL, Ltd.), is captured by a scanner to binarize the particle in the photographic image using an image processing and analyzing apparatus ("LUZEX AP", manufactured by NIRECO CORPORATION). The coverage S1/(S1+S2) (%) is calculated, where S1 is the area of the exposed portion of the particle in photosensitive member in one visual field, and S2 is the total area of the particle other than the exposed portion. The aforementioned coverage is calculated for a total of 10 visual fields, and the average value of the resulting coverage is defined as the coverage of particle in the surface layer of the photosensitive member.

<Method of Measuring Circularity of Particle Exposed in Surface Layer of Photosensitive Member>

For the particle in the surface layer, a photographic image of the surface layer of the photosensitive member, taken at a magnification of 30,000 times using a scanning electron microscope (SEM) ("S-4800", manufactured by JEOL, Ltd.), is captured by a scanner, image analysis is performed using an image processing software (ImageJ (available from https://imagej.nih.gov/ij/)) to binarize the particle in the photographic image. The electrophotographic photosensitive member according to the present invention is cut into 5 mm squares at three points of 50 mm from each end and the center in the longitudinal direction, and four points at 90 degrees each in the circumferential direction, that is, at a total of 12 points, to obtain a sample. The center of the sample is taken as one visual field, the circularity of all the particle in one visual field is calculated, and the average value of the resulting circularities is defined as the circularity of the particle exposed in the surface layer of the photosensitive member.

<Method of Measuring Unevenness of Particle Exposed in Surface Layer of Photosensitive Member>

Meanwhile, the shape factor of the exposed particle in the surface layer of the photosensitive member is obtained by randomly sampling 100 particle images enlarged by a factor of 30,000 using, for example, an FE-SEM (S-4800) manufactured by Hitachi, Ltd. Through the interface, the image information is taken into an image processing and analyzing apparatus ("LUZEX AP", manufactured by NIRECO CORPORATION), binarized, and analyzed. The value obtained by calculation from the following formula C is defined as the shape factor SF-2:

$$(SF\text{-}2)=(\mathrm{PER})2/(\mathrm{AREA})\times 1/(4\pi)\times 100 \quad (C)$$

(In the formula, PER indicates the particle perimeter, and AREA indicates the particle projected area.)

The shape factor SF-2 indicates the degree of fine unevenness on the particle surface.

If the SF-2 exceeds 135, transfer efficiency of the toner image from the photosensitive member to the intermediate transfer member and the transfer material is reduced, and transfer dropout of characters and line images is undesirably caused.

<Method of Measuring Young's Modulus of Particle Exposed in Surface Layer of Photosensitive Member>

As an evaluation apparatus, an SPM probe station ("NanoNaviReal" manufactured by Hitachi High-Tech Science Corporation) equipped with a scanning probe microscope ("S-image" manufactured by Hitachi High-Tech Science Corporation) having a built-in heater was used. Prior to measurement, the evaluation apparatus was calibrated using a polymethyl methacrylate (PMMA) particle as a reference material under the condition of an allowable range of 2.920±0.119 Gpa (Young's modulus). The Young's modulus of PMMA measured by the calibrated evaluation apparatus was 3.01 GPa.

The particle in the surface layer of the electrophotographic photosensitive member were measured with the SPM, and the average value of results of 10 measurements for one particle was defined as the Young's modulus of one particle. Furthermore, the average value of the Young's modulus of 10 particles was taken as the Young's modulus of the exposed particle in the surface layer of the photosensitive member in the present invention.

EXAMPLES

Hereinafter, the present invention will be described in more detail with Examples and Comparative Examples. The present invention is not limited at all by the following Examples as long as it does not exceed the gist thereof. Note that the term "part" or "parts" is on a mass basis unless otherwise specified in each Example below. The film thickness of each of the layers of electrophotographic photosensitive members in Examples and Comparative Examples was determined with an eddy-current film thickness meter (Fischerscope, manufactured by Fischer Instruments K.K.) or based on the specific gravity converted from a mass per unit area.

Table 1 shows the type, manufacturer, number average particle diameter, volume average particle diameter, and (volume average particle diameter)/(number average particle diameter) of the particle contained in the surface layer of the electrophotographic photosensitive member according to the present invention.

Table 1

TABLE 1

| | Particle type (trade name) | Manufacturer | Number average particle diameter (μm) | Volume average particle diameter (μm) | (Volume average particle diameter)/(Number average particle diameter) |
|---|---|---|---|---|---|
| Particle 1 | KE-P10 | NIPPON SHOKUBAI CO., LTD. | 110 | 124 | 1.1 |
| Particle 2 | KE-P30 | NIPPON SHOKUBAI CO., LTD. | 275 | 310 | 1.1 |
| Particle 3 | KE-P50 | NIPPON SHOKUBAI CO., LTD. | 480 | 550 | 1.1 |
| Particle 4 | QSG-30 | Shin-Etsu Chemical Co., Ltd. | 24 | 37 | 1.5 |
| Particle 5 | QSG-80 | Shin-Etsu Chemical Co., Ltd. | 60 | 79 | 1.3 |
| Particle 6 | QSG-170 | Shin-Etsu Chemical Co., Ltd. | 150 | 192 | 1.3 |
| Particle 7 | Microdispers-200 | Techno Chemical Corporation | 250 | 300 | 1.2 |
| Particle 8 | GTR100 | SAKAI CHEMICAL INDUSTRY CO., LTD. | 260 | 420 | 1.6 |
| Particle 9 | FS-106 | Nippon Paint Industrial Coatings Co., Ltd. | 100 | 150 | 1.5 |
| Particle 10 | TOSPEARL 145 | Momentive Performance Materials Japan LLC (formerly known as Toshiba Silicone Co., Ltd.) | 4500 | 7000 | 1.6 |

(Fabrication of Surface-Treated Particle 1)

The following materials were added and dispersed at room temperature for 30 minutes by using a US homogenizer:

Metanol: 10 parts by mass

Particle 1 (listed in Table 1): 5 parts by mass.

Next, 0.25 parts by mass of n-propyltrimethoxysilane (manufactured by Shin-Etsu Chemical Co., Ltd.) as a reactive surface treating agent and 10 parts by mass of toluene were added, followed by stirring at room temperature for 60 minutes. After the solvent was removed by an evaporator, the resultant was heated at 140° C. for 60 minutes to fabricate a surface-treated particle 1, which had been surface-treated with the reactive surface treating agent. The particle had a volume average particle diameter of 136 nm and a number average particle diameter of 124 nm.

Production Example of Electrophotographic Photosensitive Member 1

(Preparation of Support)

An aluminum cylinder (JIS-A3003, aluminium alloy) having a diameter of 20 mm and a length of 257.5 mm was used as a support (electroconductive support).

(Fabrication Example of Coating Liquid 1 for Electroconductive Layer)

The following materials were dispersed to obtain a 1 L water suspension:

Anatase-type titanium dioxide: 100 parts by mass (average primary particle diameter: 150 nm, niobium content: 0.20 wt %)

Pure water: 1,000 parts by mass.

The water suspension was heated to 60° C.

A titanium niobate solution, a mixture of a niobium solution containing 3 parts by mass of niobium pentachloride (NbC15) dissolved in 100 mL of 11.4 mol/L hydrochloric acid and 600 mL of a titanium sulfate solution containing 33.7 parts by mass of Ti, and a 10.7 mol/L sodium hydroxide solution were simultaneously added dropwise to the suspension over 3 hours so that the pH of the suspension reached 2 to 3. After completion of the dropwise addition, the suspension was filtered, washed, and dried at 110° C. for 8 hours.

The resulting dried product was subjected to a heating treatment at 800° C. for an hour in an atmospheric atmosphere, thereby obtaining powder of a metal oxide particle 1 including a core material containing titanium oxide and a coating layer containing titanium oxide doped with niobium.

Next, the following materials were mixed:

Phenol Resin (trade name: Plyophen J-325, manufactured by DIC Corporation, resin solid content: 60%, density after curing: 1.3 g/cm2): 50 parts by mass 1-Methoxy-2-propanol: 35 parts by mass Metal oxide particle 1: 75 parts by mass Glass beads (average particle diameter: 1.0 mm): 120 parts by mass.

The mixture was loaded into a vertical sand mill and subjected to a dispersion treatment for 4 hours under the conditions of a dispersion temperature of 23±3° C. and a rotation speed of 1,500 rpm (peripheral speed: 5.5 m/s), thereby obtaining a metal oxide particle dispersion 1. The glass beads were removed from the metal oxide particle dispersion 1 with a mesh, and the following materials were added thereto, followed by stirring:

Silicone oil (trade name: SH28 PAINT ADDITIVE, manufactured by Dow Corning Toray Co., Ltd.): 0.01 parts by mass.

Silicone resin particle (trade name: TOSPEARL 120, manufactured by Momentive Performance Materials, Inc., average particle diameter: 2 μm, density: 1.3 g/cm$^2$): 10 parts by mass.

The resultant was filtered under pressure using a PTFE filter (trade name: PF060, manufactured by Advantec Toyo Kaisha, Ltd.), thereby preparing a coating liquid 1 for an electroconductive layer.

(Fabrication Example of Electroconductive Layer 1)

The coating liquid 1 for an electroconductive layer was applied onto the support by dip coating and heated at 140° C. for an hour, thereby forming an electroconductive layer 1 having a film thickness of 20 μm.

(Fabrication Example of Coating Liquid 1 for Undercoat Layer)

The following materials were mixed, followed by stirring for 8 hours:

Rutile-type titanium oxide particle (average primary particle diameter: 50 nm, manufactured by Tayca Corporation): 100 parts by mass Phenol resin (trade name: Plyophen J-325, manufactured by DIC Corporation, resin solid content: 60% by mass): 132 parts by mass Toluene: 500 parts by mass Vinyltrimethoxysilane (trade name: KBM-1003, manufactured by Shin-Etsu Chemical Co., Ltd.): 5 parts by mass Glass beads (diameter: 0.8 mm): 450 parts by mass.

Thereafter, toluene was distilled off under reduced pressure, and the resultant was dried at 120° C. for 3 hours, thereby obtaining a rutile-type titanium oxide particle 1, which had been surface-treated with vinyltrimethoxysilane.

The following materials were mixed:

Surface-treated rutile-type titanium particle: 18 parts by mass

N-methoxymethylated nylon (trade name: Toresin EF-30T, manufactured by Nagase ChemteX Corporation): 4.5 parts by mass Copolymer nylon resin (trade name: Amilan CM8000, manufactured by Toray Industries, Inc.): 1.5 parts by mass Metanol: 90 parts by mass 1-Butanol: 60 parts by mass Acetone: 15 parts by mass Glass beads (average particle diameter: 1.0 mm): 120 parts by mass The mixture was subjected to a dispersion treatment for 5 hours with a vertical sand mill to prepare a coating liquid 1 for an undercoat layer.

(Fabrication Example of Undercoat Layer 1)

The coating liquid 1 for an undercoat layer was applied onto the electroconductive layer 1 by dip coating and heated at 170° C. for 30 minutes, thereby forming an undercoat layer 1 having a film thickness of 1.0 μm.

(Fabrication Example of Charge Generating Layer 1)

The following materials were dispersed in a sand mill apparatus for 6 hours:

Hydroxygallium phthalocyanine (having peaks at positions of 7.5° and 28.4° in a chart obtained by CuKα characteristic X-ray diffraction): 10 parts by mass Polyvinyl butyral resin (trade name: S-LEC BX-1, manufactured by Sekisui Chemical Co., Ltd.): 5 parts by mass Cyclohexanone: 200 parts by mass Glass beads: 200 parts by mass.

Next, 150 parts by mass of cyclohexanone and 350 parts by mass of ethyl acetate were further added thereto to obtain a coating liquid 1 for a charge generating layer. The resulting coating liquid 1 for a charge generating layer was applied onto the undercoat layer 1 by dip coating and dried at 95° C. for 10 minutes, thereby forming a charge generating layer 1 having a film thickness of 0.20 μm.

(Fabrication Example of Charge Transport layer 1)

Next, the following materials were prepared:

Charge transporting substance (hole transporting substance) represented by the structural formula (1-1): 5 parts by mass Charge transporting substance (hole transporting substance) represented by the structural formula (1-3): 5 parts by mass Polycarbonate (trade name: Iupilon Z400, manufactured by Mitsubishi Engineering-Plastics Corporation): 10 parts by mass Polycarbonate resin having copolymer unit of the following structural formulas (C-1) and (C-2): 0.02 parts (x/y=0.95/0.05, viscosity average molecular weight=20,000)

These were dissolved in a mixed solvent of 60 parts by mass of toluene/3 parts by mass of methyl benzoate/15 parts by mass of tetrahydrofuran to prepare a coating liquid 1 for a charge transport layer. This coating liquid 1 for a charge transport layer was applied onto the charge generating layer 1 by dip coating to form a coat, and the coat was dried at drying temperature of 40° C. for 5 minutes, thereby forming a charge transport layer 1 having a film thickness of 15 μm.

(C-1)

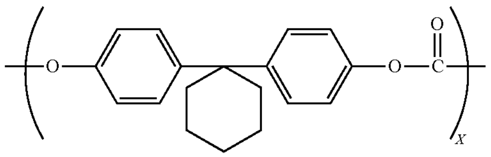

(C-2)

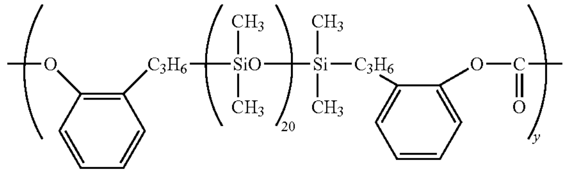

(Fabrication Example 1 of Surface Layer Containing Particle)

Next, the following materials were prepared:

Particle 1: 1.2 parts by mass (listed in Table 1)

Siloxane-modified acrylic compound (trade name: SYMAC US270, manufactured by Toagosei Co., Ltd.): 0.1 parts by mass Cyclohexane: 30 parts by mass 1-Propanol: 70 parts by mass The above-listed materials were mixed and stirred to prepare a coating liquid 1 for a surface layer.

This coating liquid for a surface layer was applied onto the charge transport layer 1 by dip coating to form a coat, and the resulting coat was dried at 100° C. for 20 minutes to obtain an electrophotographic photosensitive member 1. The following data were obtained on the electrophotographic photosensitive member 1 through measurement: a film thickness of the charge transport layer [μm], a volume average particle diameter of the particle contained in the surface layer [nm], a ratio of the number of the particle exposed from the surface layer [% by number], a volume ratio of the particle exposed from the surface layer [% by number], a coverage by the particle exposed from the surface layer S1/(S1+S2) and a coefficient of variation thereof, an average circularity and SF-2 of a shape of the exposed portion of the particle exposed from the surface layer, Young's modulus of the surface of the particle exposed from the surface layer [GPa], a volume average particle diameter/number average particle diameter of the particle, an ash content during sintering of insoluble matter in the surface layer with respect to methyl ethyl ketone [% by mass], and a content ratio of the particle contained in the surface layer [% by volume]. The results are shown in Table 3.

Production Examples 2 to 36 of Electrophotographic Photosensitive Member

Electrophotographic photosensitive members 2 to 36 were each produced in the same manner as in the production example of the electrophotographic photosensitive member 1, except that the temperature at which the coating liquid 1 for a charge transport layer in the fabrication example of the charge transport layer 1 was applied onto the charge generating layer 1 by dip coating to form a coat and dried, the type and addition amount of a particle contained in the surface layer, and an addition amount of cyclohexane and 1-propanol were changed as shown in Table 2. The physical properties of the electrophotographic photosensitive members 2 to 36 were each measured. The results are shown in Table 3.

TABLE 2

| | Charge transport layer | Particle | | Dispersion medium | | | |
|---|---|---|---|---|---|---|---|
| | Drying temperature [° C.] | Type | Addition amount (parts by mass) | Type 1 | Addition amount | Type 2 | Addition amount |
| Electrophotographic photosensitive member 1 | 40 | Particle 1 | 1.2 | 1-propanol | 70 | Cyclohexane | 30 |
| Electrophotographic photosensitive member 2 | 40 | Surface-treated particle 1 | 1.2 | 1-propanol | 50 | Cyclohexanone | 50 |
| Electrophotographic photosensitive member 3 | 40 | Surface-treated particle 1 | 1.2 | 1-propanol | 55 | Cyclohexanone | 45 |
| Electrophotographic photosensitive member 4 | 40 | Surface-treated particle 1 | 1.2 | 1-propanol | 60 | Cyclohexanone | 40 |
| Electrophotographic photosensitive member 5 | 40 | Surface-treated particle 1 | 1.2 | 1-propanol | 65 | Cyclohexanone | 35 |
| Electrophotographic photosensitive member 6 | 40 | Surface-treated particle 1 | 1.2 | 1-propanol | 80 | Cyclohexanone | 20 |
| Electrophotographic photosensitive member 7 | 40 | Surface-treated particle 1 | 1.2 | 1-propanol | 90 | Cyclohexanone | 10 |
| Electrophotographic photosensitive member 8 | 40 | Surface-treated particle 1 | 1.2 | 1-propanol | 95 | Cyclohexanone | 5 |
| Electrophotographic photosensitive member 9 | 40 | Particle 1 | 1.2 | 1-propanol | 50 | Cyclohexane | 50 |

TABLE 2-continued

| | Charge transport layer | Particle | | Dispersion medium | | | |
|---|---|---|---|---|---|---|---|
| | Drying temperature [° C.] | Type | Addition amount (parts by mass) | Type 1 | Addition amount | Type 2 | Addition amount |
| Electrophotographic photosensitive member 10 | 40 | Particle 1 | 1.2 | 1-propanol | 60 | Cyclohexane | 40 |
| Electrophotographic photosensitive member 11 | 40 | Particle 1 | 1.2 | 1-propanol | 70 | Cyclohexane | 30 |
| Electrophotographic photosensitive member 12 | 40 | Particle 1 | 1.2 | 1-propanol | 80 | Cyclohexane | 20 |
| Electrophotographic photosensitive member 13 | 40 | Particle 1 | 1.2 | 1-propanol | 90 | Cyclohexane | 10 |
| Electrophotographic photosensitive member 14 | 37 | Particle 1 | 1.2 | 1-propanol | 60 | Cyclohexane | 40 |
| Electrophotographic photosensitive member 15 | 45 | Particle 1 | 1.2 | 1-propanol | 80 | Cyclohexane | 20 |
| Electrophotographic photosensitive member 16 | 35 | Particle 1 | 1.2 | 1-propanol | 90 | Cyclohexane | 10 |
| Electrophotographic photosensitive member 17 | 47 | Particle 1 | 1.2 | 1-propanol | 90 | Cyclohexane | 10 |
| Electrophotographic photosensitive member 18 | 35 | Particle 1 | 1.2 | 1-propanol | 60 | Cyclohexane | 40 |
| Electrophotographic photosensitive member 19 | 47 | Particle 1 | 1.2 | 1-propanol | 60 | Cyclohexane | 40 |
| Electrophotographic photosensitive member 20 | 35 | Particle 1 | 1.2 | 1-propanol | 80 | Cyclohexane | 20 |
| Electrophotographic photosensitive member 21 | 47 | Particle 1 | 1.2 | 1-propanol | 80 | Cyclohexane | 20 |
| Electrophotographic photosensitive member 22 | 40 | Particle 1 | 0.3 | 1-propanol | 70 | Cyclohexane | 30 |
| Electrophotographic photosensitive member 23 | 40 | Particle 1 | 0.3 | 1-propanol | 70 | Cyclohexane | 30 |
| Electrophotographic photosensitive member 24 | 40 | Particle 1 | 0.4 | 1-propanol | 70 | Cyclohexane | 30 |
| Electrophotographic photosensitive member 25 | 40 | Particle 1 | 0.6 | 1-propanol | 70 | Cyclohexane | 30 |
| Electrophotographic photosensitive member 26 | 40 | Particle 1 | 0.9 | 1-propanol | 70 | Cyclohexane | 30 |
| Electrophotographic photosensitive member 27 | 40 | Particle 1 | 1.0 | 1-propanol | 70 | Cyclohexane | 30 |
| Electrophotographic photosensitive member 28 | 40 | Particle 1 | 2.1 | 1-propanol | 70 | Cyclohexane | 30 |
| Electrophotographic photosensitive member 29 | 40 | Particle 1 | 2.4 | 1-propanol | 70 | Cyclohexane | 30 |
| Electrophotographic photosensitive member 30 | 40 | Particle 1 | 3.1 | 1-propanol | 70 | Cyclohexane | 30 |
| Electrophotographic photosensitive member 31 | 40 | Particle 2 | 1.8 | 1-propanol | 77 | Cyclohexane | 23 |
| Electrophotographic photosensitive member 32 | 40 | Particle 6 | 1.5 | 1-propanol | 78 | Cyclohexane | 22 |
| Electrophotographic photosensitive member 33 | 40 | Particle 5 | 0.6 | 1-propanol | 77 | Cyclohexane | 23 |
| Electrophotographic photosensitive member 34 | 40 | Particle 9 | 1.2 | 1-propanol | 78 | Cyclohexane | 22 |
| Electrophotographic photosensitive member 35 | 40 | Particle 7 | 1.2 | 1-propanol | 78 | Cyclohexane | 22 |
| Electrophotographic photosensitive member 36 | 40 | Particle 8 | 1.5 | 1-propanol | 70 | Cyclohexane | 30 |

TABLE 3

| | Film thickness of charge transport layer [μm] | Volume average particle diameter of particle contained in surface layer [nm] | Ratio of number of particle exposed from surface layer [% by number] | Volume ratio of particle exposed from surface layer [% by number] | Coverage by particle S1/(S1 + S2) | Coefficient of variation of coverage by particle [%] |
|---|---|---|---|---|---|---|
| Electrophotographic photosensitive member 1 | 15 | 110.0 | 97 | 55 | 0.37 | 10 |
| Electrophotographic photosensitive member 2 | 15 | 124.0 | 97 | 55 | 0.25 | 10 |

TABLE 3-continued

| | | | | | | |
|---|---|---|---|---|---|---|
| Electrophotographic photosensitive member 3 | 15 | 124.0 | 97 | 30 | 0.32 | 10 |
| Electrophotographic photosensitive member 4 | 15 | 124.0 | 97 | 35 | 0.34 | 10 |
| Electrophotographic photosensitive member 5 | 15 | 124.0 | 97 | 38 | 0.35 | 10 |
| Electrophotographic photosensitive member 6 | 15 | 124.0 | 97 | 70 | 0.40 | 10 |
| Electrophotographic photosensitive member 7 | 15 | 124.0 | 97 | 75 | 0.45 | 10 |
| Electrophotographic photosensitive member 8 | 15 | 124.0 | 97 | 80 | 0.50 | 10 |
| Electrophotographic photosensitive member 9 | 15 | 110.0 | 80 | 50 | 0.25 | 30 |
| Electrophotographic photosensitive member 10 | 15 | 110.0 | 82 | 50 | 0.30 | 27 |
| Electrophotographic photosensitive member 11 | 15 | 110.0 | 85 | 50 | 0.30 | 24 |
| Electrophotographic photosensitive member 12 | 15 | 110.0 | 88 | 50 | 0.32 | 15 |
| Electrophotographic photosensitive member 13 | 15 | 110.0 | 93 | 50 | 0.35 | 12 |
| Electrophotographic photosensitive member 14 | 15 | 110.0 | 90 | 42 | 0.40 | 13 |
| Electrophotographic photosensitive member 15 | 15 | 110.0 | 90 | 70 | 0.45 | 13 |
| Electrophotographic photosensitive member 16 | 15 | 110.0 | 90 | 32 | 0.30 | 13 |
| Electrophotographic photosensitive member 17 | 15 | 110.0 | 90 | 78 | 0.45 | 13 |
| Electrophotographic photosensitive member 18 | 15 | 110.0 | 82 | 32 | 0.25 | 27 |
| Electrophotographic photosensitive member 19 | 15 | 110.0 | 82 | 78 | 0.40 | 27 |
| Electrophotographic photosensitive member 20 | 15 | 110.0 | 88 | 32 | 0.27 | 15 |
| Electrophotographic photosensitive member 21 | 15 | 110.0 | 88 | 78 | 0.42 | 15 |
| Electrophotographic photosensitive member 22 | 15 | 110.0 | 97 | 50 | 0.10 | 10 |
| Electrophotographic photosensitive member 23 | 15 | 110.0 | 97 | 50 | 0.13 | 10 |
| Electrophotographic photosensitive member 24 | 15 | 110.0 | 97 | 50 | 0.15 | 10 |
| Electrophotographic photosensitive member 25 | 15 | 110.0 | 97 | 50 | 0.20 | 10 |
| Electrophotographic photosensitive member 26 | 15 | 110.0 | 97 | 50 | 0.25 | 10 |
| Electrophotographic photosensitive member 27 | 15 | 110.0 | 97 | 50 | 0.60 | 10 |
| Electrophotographic photosensitive member 28 | 15 | 110.0 | 97 | 50 | 0.70 | 10 |
| Electrophotographic photosensitive member 29 | 15 | 110.0 | 97 | 50 | 0.80 | 10 |
| Electrophotographic photosensitive member 30 | 15 | 110.0 | 97 | 50 | 0.85 | 10 |
| Electrophotographic photosensitive member 31 | 15 | 310.0 | 82 | 51 | 0.25 | 27 |
| Electrophotographic photosensitive member 32 | 15 | 192.0 | 85 | 60 | 0.35 | 24 |
| Electrophotographic photosensitive member 33 | 15 | 79.0 | 88 | 70 | 0.34 | 15 |
| Electrophotographic photosensitive member 34 | 15 | 100.0 | 90 | 55 | 0.34 | 13 |
| Electrophotographic photosensitive member 35 | 15 | 250.0 | 88 | 53 | 0.35 | 15 |
| Electrophotographic photosensitive member 36 | 15 | 260.0 | 95 | 60 | 0.31 | 11 |

| | Average circularity of shape of exposed portion of particle | SF-2 of shape of exposed portion of particle | Young's modulus of particle surface [GPa] | Volume average particle diameter/number average particle diameter of particle | Ash content during sintering of insoluble matter in surface layer with respect to methyl ethyl ketone [% by weight] |
|---|---|---|---|---|---|
| Electrophotographic photosensitive member 1 | 0.97 | 105 | 80 | 1.1 | 2.0 |

TABLE 3-continued

| | | | | | |
|---|---|---|---|---|---|
| Electrophotographic photosensitive member 2 | 0.96 | 107 | 80 | 1.1 | 2.0 |
| Electrophotographic photosensitive member 3 | 0.96 | 107 | 80 | 1.1 | 2.0 |
| Electrophotographic photosensitive member 4 | 0.96 | 107 | 80 | 1.1 | 2.0 |
| Electrophotographic photosensitive member 5 | 0.96 | 107 | 80 | 1.1 | 2.0 |
| Electrophotographic photosensitive member 6 | 0.96 | 107 | 80 | 1.1 | 2.0 |
| Electrophotographic photosensitive member 7 | 0.96 | 107 | 80 | 1.1 | 2.0 |
| Electrophotographic photosensitive member 8 | 0.98 | 103 | 80 | 1.1 | 2.0 |
| Electrophotographic photosensitive member 9 | 0.97 | 105 | 80 | 1.1 | 2.0 |
| Electrophotographic photosensitive member 10 | 0.97 | 105 | 80 | 1.1 | 2.0 |
| Electrophotographic photosensitive member 11 | 0.96 | 107 | 80 | 1.1 | 2.0 |
| Electrophotographic photosensitive member 12 | 0.96 | 107 | 80 | 1.1 | 2.0 |
| Electrophotographic photosensitive member 13 | 0.96 | 107 | 80 | 1.1 | 2.0 |
| Electrophotographic photosensitive member 14 | 0.96 | 107 | 80 | 1.1 | 2.0 |
| Electrophotographic photosensitive member 15 | 0.96 | 107 | 80 | 1.1 | 2.0 |
| Electrophotographic photosensitive member 16 | 0.96 | 107 | 80 | 1.1 | 2.0 |
| Electrophotographic photosensitive member 17 | 0.96 | 107 | 80 | 1.1 | 2.0 |
| Electrophotographic photosensitive member 18 | 0.97 | 105 | 80 | 1.1 | 2.0 |
| Electrophotographic photosensitive member 19 | 0.97 | 105 | 80 | 1.1 | 2.0 |
| Electrophotographic photosensitive member 20 | 0.96 | 107 | 80 | 1.1 | 2.0 |
| Electrophotographic photosensitive member 21 | 0.96 | 107 | 80 | 1.1 | 2.0 |
| Electrophotographic photosensitive member 22 | 0.97 | 105 | 80 | 1.2 | 0.5 |
| Electrophotographic photosensitive member 23 | 0.98 | 103 | 80 | 1.1 | 0.5 |
| Electrophotographic photosensitive member 24 | 0.97 | 105 | 80 | 1.1 | 0.6 |
| Electrophotographic photosensitive member 25 | 0.96 | 107 | 80 | 1.1 | 1.0 |
| Electrophotographic photosensitive member 26 | 0.96 | 107 | 80 | 1.1 | 1.5 |
| Electrophotographic photosensitive member 27 | 0.97 | 105 | 80 | 1.1 | 1.7 |
| Electrophotographic photosensitive member 28 | 0.96 | 107 | 80 | 1.1 | 3.5 |
| Electrophotographic photosensitive member 29 | 0.96 | 107 | 80 | 1.1 | 4.0 |
| Electrophotographic photosensitive member 30 | 0.98 | 103 | 80 | 1.1 | 5.1 |
| Electrophotographic photosensitive member 31 | 0.97 | 105 | 80 | 1.1 | 3.0 |
| Electrophotographic photosensitive member 32 | 0.96 | 107 | 80 | 1.3 | 2.5 |
| Electrophotographic photosensitive member 33 | 0.96 | 107 | 80 | 1.3 | 1.0 |
| Electrophotographic photosensitive member 34 | 0.98 | 103 | 1.6 | 1.5 | 2.0 |
| Electrophotographic photosensitive member 35 | 0.98 | 103 | 0.5 | 1.2 | 2.0 |
| Electrophotographic photosensitive member 36 | 0.85 | 140 | 340 | 1.6 | 2.5 |

Production Example of Electrophotographic Photosensitive Member 37

An electrophotographic photosensitive member was produced in the same manner as in the production example of the electrophotographic photosensitive member 1 up to the fabrication example of the charge transport layer 1, except that a coating liquid 37 for a charge transport layer was applied onto a charge generating layer 37 by dip coating to form a coat, and the coat was dried at a drying temperature of 120° C. for 5 minutes to fabricate a charge transport layer 37 having a film thickness of 15 μm.

Fabrication Example 2 of Surface Layer Containing Particle

Next, the following materials were prepared:

Particle 1: 1.2 parts by mass (listed in Table 1)

Charge transporting substance (hole transporting substance) represented by the structural formula (2-1): 0.1 parts by mass Charge transporting substance (hole transporting substance) represented by the structural formula (3-1): 0.2 parts by mass Siloxane-modified acrylic compound (trade name: SYMAC US270, manufactured by Toagosei Co., Ltd.): 0.1 parts by mass Cyclohexane: 30 parts by mass 1-Propanol: 70 parts by mass The above-listed materials were mixed and stirred to prepare a coating liquid 2 for a surface layer.

The coating liquid 2 for a surface layer was applied onto the charge transport layer 1 by dip coating to form a coat, and the resulting coat was dried at 40° C. for 5 minutes.

Thereafter, the coat was irradiated with an electron beam for 1.6 seconds while the support (irradiation target) was rotated at a speed of 300 rpm in the conditions of an acceleration voltage of 70 kV and a beam current of 5.0 mA under a nitrogen atmosphere. A dose at a position on the outermost surface layer was 15 kGy. After that, under the nitrogen atmosphere, first heating was performed by increasing the temperature of the coat from 25° C. to 100° C. over 20 seconds to form a surface layer having a film thickness of 1.0 μm. An oxygen concentration during a period from the electron beam irradiation to the subsequent heating treatment was 10 ppm or less. Next, in the air, the coat was naturally cooled until the temperature thereof became 25° C., and second heating treatment was performed for 20 minutes under such a condition that the temperature of the coat became 100° C. Thus, an electrophotographic photosensitive member 37 was produced. The following data were obtained on the electrophotographic photosensitive member 37 through measurement: a film thickness of the charge transport layer [μm], a film thickness of the surface layer [μm], a volume average particle diameter of the particle contained in the surface layer [nm], a ratio of the number of the particle exposed from the surface layer [% by number], a volume ratio of the particle exposed from the surface layer [% by number], a coverage by the particle exposed from the surface layer S1/(S1+S2), an average circularity of a shape of the exposed portion of the particle exposed from the surface layer, Young's modulus of the surface of the particle exposed from the surface layer [GPa], a volume average particle diameter/number average particle diameter of the particle, an ash content during sintering of insoluble matter in the surface layer with respect to methyl ethyl ketone [% by mass], and a content ratio of the particle contained in the surface layer [% by volume]. The results are shown in Table 5.

Production Examples 38 to 72 of Electrophotographic Photosensitive Member

Electrophotographic photosensitive members 38 to 72 were each produced in the same manner as in the production example of the electrophotographic photosensitive member 37, except that the temperature at which the coating liquid 37 for a charge transport layer in the fabrication example of the charge transport layer 37 was applied onto the charge generating layer 37 by dip coating to form a coat and dried, and in the fabrication example 2 of the surface layer containing particle, the type and addition amount of the particle contained in the surface layer, and an addition amount of cyclohexane and 1-propanol were changed as shown in Table 4. The physical properties of the electrophotographic photosensitive members 38 to 72 were each measured. The results are shown in Table 5.

TABLE 4

| | Charge transport layer Drying temperature [° C.] | Particle | | Dispersion medium | | | |
|---|---|---|---|---|---|---|---|
| | | Type | Addition amount (parts by mass) | Type 1 | Addition amount | Type 2 | Addition amount |
| Electrophotographic photosensitive member 37 | 120 | Particle 1 | 1.2 | 1-propanol | 70 | Cyclohexane | 30 |
| Electrophotographic photosensitive member 38 | 120 | Surface-treated particle 1 | 1.2 | 1-propanol | 50 | Cyclohexanone | 50 |
| Electrophotographic photosensitive member 39 | 120 | Surface-treated particle 1 | 1.2 | 1-propanol | 55 | Cyclohexanone | 45 |
| Electrophotographic photosensitive member 40 | 120 | Surface-treated particle 1 | 1.2 | 1-propanol | 60 | Cyclohexanone | 40 |
| Electrophotographic photosensitive member 41 | 120 | Surface-treated particle 1 | 1.2 | 1-propanol | 65 | Cyclohexanone | 35 |
| Electrophotographic photosensitive member 42 | 120 | Surface-treated particle 1 | 1.2 | 1-propanol | 80 | Cyclohexanone | 20 |
| Electrophotographic photosensitive member 43 | 120 | Surface-treated particle 1 | 1.2 | 1-propanol | 90 | Cyclohexanone | 10 |
| Electrophotographic photosensitive member 44 | 120 | Surface-treated particle 1 | 1.2 | 1-propanol | 95 | Cyclohexanone | 5 |
| Electrophotographic photosensitive member 45 | 120 | Particle 1 | 1.2 | 1-propanol | 50 | Cyclohexane | 50 |
| Electrophotographic photosensitive member 46 | 120 | Particle 1 | 1.2 | 1-propanol | 60 | Cyclohexane | 40 |
| Electrophotographic photosensitive member 47 | 120 | Particle 1 | 1.2 | 1-propanol | 70 | Cyclohexane | 30 |
| Electrophotographic photosensitive member 48 | 120 | Particle 1 | 1.2 | 1-propanol | 80 | Cyclohexane | 20 |
| Electrophotographic photosensitive member 49 | 120 | Particle 1 | 1.2 | 1-propanol | 90 | Cyclohexane | 10 |
| Electrophotographic photosensitive member 50 | 120 | Particle 1 | 1.2 | 1-propanol | 60 | Cyclohexane | 40 |
| Electrophotographic photosensitive member 51 | 120 | Particle 1 | 1.2 | 1-propanol | 80 | Cyclohexane | 20 |
| Electrophotographic photosensitive member 52 | 120 | Particle 1 | 1.2 | 1-propanol | 90 | Cyclohexane | 10 |
| Electrophotographic photosensitive member 53 | 120 | Particle 1 | 1.2 | 1-propanol | 90 | Cyclohexane | 10 |
| Electrophotographic photosensitive member 54 | 120 | Particle 1 | 1.2 | 1-propanol | 60 | Cyclohexane | 40 |

TABLE 4-continued

| | Charge transport layer Drying temperature [° C.] | Particle | | Dispersion medium | | | |
|---|---|---|---|---|---|---|---|
| | | Type | Addition amount (parts by mass) | Type 1 | Addition amount | Type 2 | Addition amount |
| Electrophotographic photosensitive member 55 | 120 | Particle 1 | 1.2 | 1-propanol | 60 | Cyclohexane | 40 |
| Electrophotographic photosensitive member 56 | 120 | Particle 1 | 1.2 | 1-propanol | 80 | Cyclohexane | 20 |
| Electrophotographic photosensitive member 57 | 120 | Particle 1 | 1.2 | 1-propanol | 80 | Cyclohexane | 20 |
| Electrophotographic photosensitive member 58 | 120 | Particle 1 | 0.3 | 1-propanol | 70 | Cyclohexane | 30 |
| Electrophotographic photosensitive member 59 | 120 | Particle 1 | 0.3 | 1-propanol | 70 | Cyclohexane | 30 |
| Electrophotographic photosensitive member 60 | 120 | Particle 1 | 0.4 | 1-propanol | 70 | Cyclohexane | 30 |
| Electrophotographic photosensitive member 61 | 120 | Particle 1 | 0.6 | 1-propanol | 70 | Cyclohexane | 30 |
| Electrophotographic photosensitive member 62 | 120 | Particle 1 | 0.9 | 1-propanol | 70 | Cyclohexane | 30 |
| Electrophotographic photosensitive member 63 | 120 | Particle 1 | 1.0 | 1-propanol | 70 | Cyclohexane | 30 |
| Electrophotographic photosensitive member 64 | 120 | Particle 1 | 2.1 | 1-propanol | 70 | Cyclohexane | 30 |
| Electrophotographic photosensitive member 65 | 120 | Particle 1 | 2.4 | 1-propanol | 70 | Cyclohexane | 30 |
| Electrophotographic photosensitive member 66 | 120 | Particle 1 | 3.3 | 1-propanol | 70 | Cyclohexane | 30 |
| Electrophotographic photosensitive member 67 | 120 | Particle 2 | 1.8 | 1-propanol | 77 | Cyclohexane | 23 |
| Electrophotographic photosensitive member 68 | 120 | Particle 6 | 1.5 | 1-propanol | 78 | Cyclohexane | 22 |
| Electrophotographic photosensitive member 69 | 120 | Particle 5 | 0.6 | 1-propanol | 77 | Cyclohexane | 23 |
| Electrophotographic photosensitive member 70 | 120 | Particle 9 | 1.2 | 1-propanol | 78 | Cyclohexane | 22 |
| Electrophotographic photosensitive member 71 | 120 | Particle 7 | 1.2 | 1-propanol | 78 | Cyclohexane | 22 |
| Electrophotographic photosensitive member 72 | 120 | Particle 8 | 1.5 | 1-propanol | 70 | Cyclohexane | 30 |

TABLE 5

| | Film thickness of charge transport layer [μm] | Film thickness of surface layer [μm] | Volume average particle diameter of particle contained in surface layer [nm] | Ratio of number of particle exposed from surface layer [% by number] |
|---|---|---|---|---|
| Electrophotographic photosensitive member 37 | 15 | 1 | 110.0 | 97 |
| Electrophotographic photosensitive member 38 | 15 | 1 | 124.0 | 97 |
| Electrophotographic photosensitive member 39 | 15 | 1 | 124.0 | 97 |
| Electrophotographic photosensitive member 40 | 15 | 1 | 124.0 | 97 |
| Electrophotographic photosensitive member 41 | 15 | 1 | 124.0 | 97 |
| Electrophotographic photosensitive member 42 | 15 | 1 | 124.0 | 97 |
| Electrophotographic photosensitive member 43 | 15 | 1 | 124.0 | 97 |
| Electrophotographic photosensitive member 44 | 15 | 1 | 124.0 | 97 |
| Electrophotographic photosensitive member 45 | 15 | 1 | 110.0 | 80 |
| Electrophotographic photosensitive member 46 | 15 | 1 | 110.0 | 82 |
| Electrophotographic photosensitive member 47 | 15 | 1 | 110.0 | 85 |
| Electrophotographic photosensitive member 48 | 15 | 1 | 110.0 | 88 |
| Electrophotographic photosensitive member 49 | 15 | 1 | 110.0 | 93 |
| Electrophotographic photosensitive member 50 | 15 | 1 | 110.0 | 90 |
| Electrophotographic photosensitive member 51 | 15 | 1 | 110.0 | 90 |
| Electrophotographic photosensitive member 52 | 15 | 1 | 110.0 | 90 |
| Electrophotographic photosensitive member 53 | 15 | 1 | 110.0 | 90 |
| Electrophotographic photosensitive member 54 | 15 | 1 | 110.0 | 82 |
| Electrophotographic photosensitive member 55 | 15 | 1 | 110.0 | 82 |
| Electrophotographic photosensitive member 56 | 15 | 1 | 110.0 | 88 |
| Electrophotographic photosensitive member 57 | 15 | 1 | 110.0 | 88 |
| Electrophotographic photosensitive member 58 | 15 | 1 | 110.0 | 97 |
| Electrophotographic photosensitive member 59 | 15 | 1 | 110.0 | 97 |
| Electrophotographic photosensitive member 60 | 15 | 1 | 110.0 | 97 |
| Electrophotographic photosensitive member 61 | 15 | 1 | 110.0 | 97 |
| Electrophotographic photosensitive member 62 | 15 | 1 | 110.0 | 97 |
| Electrophotographic photosensitive member 63 | 15 | 1 | 110.0 | 97 |
| Electrophotographic photosensitive member 64 | 15 | 1 | 110.0 | 97 |
| Electrophotographic photosensitive member 65 | 15 | 1 | 110.0 | 97 |
| Electrophotographic photosensitive member 66 | 15 | 1 | 110.0 | 97 |
| Electrophotographic photosensitive member 67 | 15 | 1 | 310.0 | 82 |
| Electrophotographic photosensitive member 68 | 15 | 1 | 192.0 | 85 |
| Electrophotographic photosensitive member 69 | 15 | 1 | 79.0 | 88 |
| Electrophotographic photosensitive member 70 | 15 | 1 | 100.0 | 90 |
| Electrophotographic photosensitive member 71 | 15 | 1 | 250.0 | 88 |
| Electrophotographic photosensitive member 72 | 15 | 1 | 260.0 | 95 |
| Electrophotographic photosensitive member 73 | 15 | — | 124.0 | 97 |

TABLE 5-continued

| | Volume ratio of particle exposed from surface layer [% by number] | Coverage by particle S1/(S1 + S2) | Coefficient of variation of coverage by particle [%] |
|---|---|---|---|
| Electrophotographic photosensitive member 37 | 55 | 0.37 | 10 |
| Electrophotographic photosensitive member 38 | 55 | 0.25 | 10 |
| Electrophotographic photosensitive member 39 | 30 | 0.32 | 10 |
| Electrophotographic photosensitive member 40 | 35 | 0.34 | 10 |
| Electrophotographic photosensitive member 41 | 38 | 0.35 | 10 |
| Electrophotographic photosensitive member 42 | 70 | 0.40 | 10 |
| Electrophotographic photosensitive member 43 | 75 | 0.45 | 10 |
| Electrophotographic photosensitive member 44 | 80 | 0.50 | 10 |
| Electrophotographic photosensitive member 45 | 50 | 0.25 | 30 |
| Electrophotographic photosensitive member 46 | 50 | 0.30 | 27 |
| Electrophotographic photosensitive member 47 | 50 | 0.30 | 24 |
| Electrophotographic photosensitive member 48 | 50 | 0.32 | 15 |
| Electrophotographic photosensitive member 49 | 50 | 0.35 | 12 |
| Electrophotographic photosensitive member 50 | 42 | 0.40 | 13 |
| Electrophotographic photosensitive member 51 | 70 | 0.45 | 13 |
| Electrophotographic photosensitive member 52 | 32 | 0.30 | 13 |
| Electrophotographic photosensitive member 53 | 78 | 0.45 | 13 |
| Electrophotographic photosensitive member 54 | 32 | 0.25 | 27 |
| Electrophotographic photosensitive member 55 | 78 | 0.40 | 27 |
| Electrophotographic photosensitive member 56 | 32 | 0.27 | 15 |
| Electrophotographic photosensitive member 57 | 78 | 0.42 | 15 |
| Electrophotographic photosensitive member 58 | 50 | 0.10 | 10 |
| Electrophotographic photosensitive member 59 | 50 | 0.13 | 10 |
| Electrophotographic photosensitive member 60 | 50 | 0.15 | 10 |
| Electrophotographic photosensitive member 61 | 50 | 0.20 | 10 |
| Electrophotographic photosensitive member 62 | 50 | 0.25 | 10 |
| Electrophotographic photosensitive member 63 | 50 | 0.60 | 10 |
| Electrophotographic photosensitive member 64 | 50 | 0.70 | 10 |
| Electrophotographic photosensitive member 65 | 50 | 0.80 | 10 |
| Electrophotographic photosensitive member 66 | 50 | 0.85 | 10 |
| Electrophotographic photosensitive member 67 | 51 | 0.25 | 27 |
| Electrophotographic photosensitive member 68 | 60 | 0.35 | 24 |
| Electrophotographic photosensitive member 69 | 70 | 0.34 | 15 |
| Electrophotographic photosensitive member 70 | 55 | 0.34 | 13 |
| Electrophotographic photosensitive member 71 | 53 | 0.35 | 15 |
| Electrophotographic photosensitive member 72 | 60 | 0.31 | 11 |
| Electrophotographic photosensitive member 73 | 45 | 0.32 | 10 |

| | Average circularity of shape of exposed portion of particle | SF-2 of shape of exposed portion of particle | Young's modulus of particle surface [GPa] | Volume average particle diameter/number average particle diameter of particle |
|---|---|---|---|---|
| Electrophotographic photosensitive member 37 | 0.97 | 105 | 80 | 1.1 |
| Electrophotographic photosensitive member 38 | 0.96 | 107 | 80 | 1.1 |
| Electrophotographic photosensitive member 39 | 0.96 | 107 | 80 | 1.1 |
| Electrophotographic photosensitive member 40 | 0.96 | 107 | 80 | 1.1 |
| Electrophotographic photosensitive member 41 | 0.96 | 107 | 80 | 1.1 |
| Electrophotographic photosensitive member 42 | 0.96 | 107 | 80 | 1.1 |
| Electrophotographic photosensitive member 43 | 0.96 | 107 | 80 | 1.1 |
| Electrophotographic photosensitive member 44 | 0.98 | 103 | 80 | 1.1 |
| Electrophotographic photosensitive member 45 | 0.97 | 105 | 80 | 1.1 |
| Electrophotographic photosensitive member 46 | 0.97 | 105 | 80 | 1.1 |
| Electrophotographic photosensitive member 47 | 0.96 | 107 | 80 | 1.1 |
| Electrophotographic photosensitive member 48 | 0.96 | 107 | 80 | 1.1 |
| Electrophotographic photosensitive member 49 | 0.96 | 107 | 80 | 1.1 |
| Electrophotographic photosensitive member 50 | 0.96 | 107 | 80 | 1.1 |
| Electrophotographic photosensitive member 51 | 0.96 | 107 | 80 | 1.1 |
| Electrophotographic photosensitive member 52 | 0.96 | 107 | 80 | 1.1 |
| Electrophotographic photosensitive member 53 | 0.96 | 107 | 80 | 1.1 |
| Electrophotographic photosensitive member 54 | 0.97 | 105 | 80 | 1.1 |
| Electrophotographic photosensitive member 55 | 0.97 | 105 | 80 | 1.1 |
| Electrophotographic photosensitive member 56 | 0.96 | 107 | 80 | 1.1 |
| Electrophotographic photosensitive member 57 | 0.96 | 107 | 80 | 1.1 |
| Electrophotographic photosensitive member 58 | 0.97 | 105 | 80 | 1.2 |
| Electrophotographic photosensitive member 59 | 0.98 | 103 | 80 | 1.1 |
| Electrophotographic photosensitive member 60 | 0.97 | 105 | 80 | 1.1 |
| Electrophotographic photosensitive member 61 | 0.96 | 107 | 80 | 1.1 |
| Electrophotographic photosensitive member 62 | 0.96 | 107 | 80 | 1.1 |
| Electrophotographic photosensitive member 63 | 0.97 | 105 | 80 | 1.1 |
| Electrophotographic photosensitive member 64 | 0.96 | 107 | 80 | 1.1 |

TABLE 5-continued

| | | | | |
|---|---|---|---|---|
| Electrophotographic photosensitive member 65 | 0.96 | 107 | 80 | 1.1 |
| Electrophotographic photosensitive member 66 | 0.98 | 103 | 80 | 1.1 |
| Electrophotographic photosensitive member 67 | 0.97 | 105 | 80 | 1.1 |
| Electrophotographic photosensitive member 68 | 0.96 | 107 | 80 | 1.3 |
| Electrophotographic photosensitive member 69 | 0.96 | 107 | 80 | 1.3 |
| Electrophotographic photosensitive member 70 | 0.98 | 103 | 1.6 | 1.5 |
| Electrophotographic photosensitive member 71 | 0.98 | 103 | 0.5 | 1.2 |
| Electrophotographic photosensitive member 72 | 0.85 | 140 | 340 | 1.6 |
| Electrophotographic photosensitive member 73 | 0.96 | 105 | 80.0 | 1.1 |

| | Ash content during sintering of insoluble matter in surface layer with respect to methyl ethyl ketone [% by weight] | Content ratio of particle contained in protective layer [% by volume] |
|---|---|---|
| Electrophotographic photosensitive member 37 | 1.9 | 50 |
| Electrophotographic photosensitive member 38 | 1.9 | 50 |
| Electrophotographic photosensitive member 39 | 1.9 | 50 |
| Electrophotographic photosensitive member 40 | 1.9 | 50 |
| Electrophotographic photosensitive member 41 | 1.9 | 50 |
| Electrophotographic photosensitive member 42 | 1.9 | 50 |
| Electrophotographic photosensitive member 43 | 1.9 | 50 |
| Electrophotographic photosensitive member 44 | 1.9 | 50 |
| Electrophotographic photosensitive member 45 | 1.9 | 50 |
| Electrophotographic photosensitive member 46 | 1.9 | 50 |
| Electrophotographic photosensitive member 47 | 1.9 | 50 |
| Electrophotographic photosensitive member 48 | 1.9 | 50 |
| Electrophotographic photosensitive member 49 | 1.9 | 50 |
| Electrophotographic photosensitive member 50 | 1.9 | 50 |
| Electrophotographic photosensitive member 51 | 1.9 | 50 |
| Electrophotographic photosensitive member 52 | 1.9 | 50 |
| Electrophotographic photosensitive member 53 | 1.9 | 50 |
| Electrophotographic photosensitive member 54 | 1.9 | 50 |
| Electrophotographic photosensitive member 55 | 1.9 | 50 |
| Electrophotographic photosensitive member 56 | 1.9 | 50 |
| Electrophotographic photosensitive member 57 | 1.9 | 50 |
| Electrophotographic photosensitive member 58 | 0.4 | 11 |
| Electrophotographic photosensitive member 59 | 0.5 | 13 |
| Electrophotographic photosensitive member 60 | 0.6 | 15 |
| Electrophotographic photosensitive member 61 | 0.9 | 25 |
| Electrophotographic photosensitive member 62 | 1.4 | 38 |
| Electrophotographic photosensitive member 63 | 1.6 | 43 |
| Electrophotographic photosensitive member 64 | 3.3 | 88 |
| Electrophotographic photosensitive member 65 | 3.8 | 100 |
| Electrophotographic photosensitive member 66 | 5.2 | 138 |
| Electrophotographic photosensitive member 67 | 2.8 | 75 |
| Electrophotographic photosensitive member 68 | 2.3 | 63 |
| Electrophotographic photosensitive member 69 | 0.9 | 25 |
| Electrophotographic photosensitive member 70 | 1.9 | 50 |
| Electrophotographic photosensitive member 71 | 1.9 | 50 |
| Electrophotographic photosensitive member 72 | 2.3 | 63 |
| Electrophotographic photosensitive member 73 | 2.0 | — |

Production Example of Electrophotographic Photosensitive Member 73

An electrophotographic photosensitive member was produced in the same manner as in the production example of the electrophotographic photosensitive member 1 up to the production example 1 of the undercoat layer.

[Formation of Monolayered Photosensitive Layer]

[Production of Photosensitive Member]

The following compounds were put into a container:

Charge generating agent, titanyl phthalocyanine: 2 parts by mass

Hole transporting agent (HTM-1): 65 parts by mass

Electron transporting agent (ETM-1): 33.5 parts by mass

Electron transporting agent (ETM-2): 33.5 parts by mass

Resin (formula D below): 138 parts by mass

Solvent (tetrahydrofuran): 400 parts by mass

Thus, a photosensitive layer-forming coating liquid 73 was obtained. The photosensitive layer-forming coating liquid 73 was applied onto the support by dip coating and heated at 40° C. for 5 minutes, thereby forming monolayered photosensitive layer 1 having a film thickness of 15 μm.

(HTM-1)

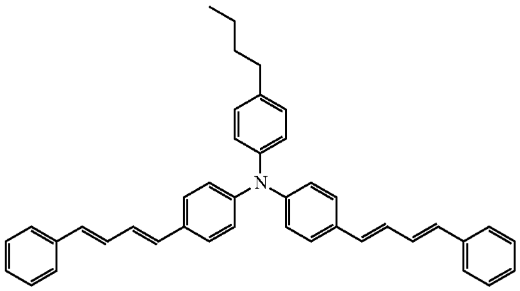

ETM-1

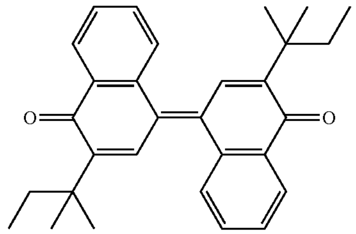

ETM-2

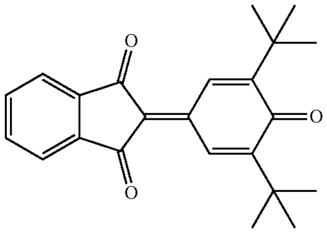

(D)

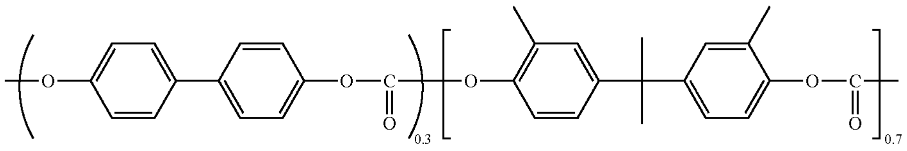

(Fabrication Example 3 of Surface Layer Containing Particle)

Next, the following materials were prepared:

Particle 1: 1.2 parts by mass (listed in Table 1)

Siloxane-modified acrylic compound (trade name: SYMAC US270, manufactured by Toagosei Co., Ltd.): 0.1 parts by mass Cyclohexane: 30 parts by mass 1-Propanol: 70 parts by mass The above-listed materials were mixed and stirred to prepare a coating liquid 3 for a surface layer.

The coating liquid 3 for a surface layer was applied onto the monolayered photosensitive layer 1 by dip coating to form a coat, and the resulting coat was dried at 100° C. for 20 minutes to obtain an electrophotographic photosensitive member 73. The following data were obtained through measurement: a film thickness of the charge transport layer [μm], a volume average particle diameter of the particle contained in the surface layer [nm], a ratio of the number of the particle exposed from the surface layer [% by number], a volume ratio of the particle exposed from the surface layer [% by number], a coverage by the particle exposed from the surface layer S1(S1+S2), an average circularity of a shape of the exposed portion of the particle exposed from the surface layer, Young's modulus of the surface of the particle exposed from the surface layer [GPa], a volume average particle diameter/number average particle diameter of the particle, an ash content during sintering of insoluble matter in the surface layer with respect to methyl ethyl ketone [% by mass], and a content ratio of the particle contained in the surface layer [% by volume]. The results are shown in Table 5.

Production Examples 74 to 88 of Electrophotographic Photosensitive Member

Electrophotographic photosensitive members 74 to 88 were each produced in the same manner as in the production example of the electrophotographic photosensitive member 1, except that the temperature at which the coating liquid 1 for a charge transport layer in the fabrication example of the charge transport layer 1 was applied onto the charge generating layer 1 by dip coating to form a coat and dried, the type and addition amount of a particle contained in the surface layer, and an addition amount of cyclohexane and 1-propanol were changed as shown in Table 6. The physical properties of the electrophotographic photosensitive members 74 to 88 were each measured. The results are shown in Table 7.

TABLE 6

| | Charge transport layer Drying temperature [° C.] | Particle Type | Particle Addition amount (parts by mass) | Dispersion medium Type 1 | Dispersion medium Addition amount | Dispersion medium Type 2 | Dispersion medium Addition amount |
|---|---|---|---|---|---|---|---|
| Electrophotographic photosensitive member 74 | 40 | Particle 3 | 1.2 | 1-Propanol | 78 | Cyclohexane | 22 |
| Electrophotographic photosensitive member 75 | 40 | Particle 4 | 1.2 | 1-Propanol | 78 | Cyclohexane | 22 |
| Electrophotographic photosensitive member 76 | 40 | Particle 9 | 1.2 | 1-Propanol | 78 | Cyclohexane | 22 |
| Electrophotographic photosensitive member 77 | 40 | Particle 1 | 1.2 | 1-Propanol | 90 | Cyclohexane | 10 |
| Electrophotographic photosensitive member 78 | 40 | Particle 1 | 1.2 | 1-Propanol | 90 | Cyclohexane | 10 |
| Electrophotographic photosensitive member 79 | 40 | Particle 1 | 1.2 | 1-Propanol | 90 | Cyclohexane | 10 |
| Electrophotographic photosensitive member 80 | 40 | Particle 1 | 1.2 | 1-Propanol | 90 | Cyclohexane | 10 |
| Electrophotographic photosensitive member 81 | 40 | Surface-treated particle 1 | 1.2 | 1-Propanol | 98 | Cyclohexane | 3 |
| Electrophotographic photosensitive member 82 | 40 | Surface-treated particle 1 | 1.2 | 1-Propanol | 70 | Cyclohexane | 30 |
| Electrophotographic photosensitive member 83 | 50 | Particle 1 | 1.2 | 1-Propanol | 70 | Cyclohexanone | 30 |
| Electrophotographic photosensitive member 84 | 32 | Particle 1 | 1.2 | 1-Propanol | 70 | Cyclohexanone | 30 |
| Electrophotographic photosensitive member 85 | 50 | Particle 1 | 1.2 | 1-Propanol | 40 | Cyclohexanone | 60 |
| Electrophotographic photosensitive member 86 | 32 | Particle 1 | 1.2 | 1-Propanol | 40 | Cyclohexanone | 60 |
| Electrophotographic photosensitive member 87 | 50 | Particle 1 | 1.2 | 1-Propanol | 70 | Cyclohexanone | 30 |
| Electrophotographic photosensitive member 88 | 32 | Particle 1 | 1.2 | 1-Propanol | 70 | Cyclohexanone | 30 |

TABLE 7

| | Film thickness of charge transport layer [μm] | Volume average particle diameter of particle contained in surface layer [nm] | Ratio of number of particle exposed from surface layer [% by number] | Volume ratio of particle exposed from surface layer [% by number] | Coverage by particle S1/(S1 + S2) | Average circularity of shape of exposed portion of particle |
|---|---|---|---|---|---|---|
| Electrophotographic photosensitive member 74 | 15 | 550 | 95 | 25 | 0.32 | 0.96 |
| Electrophotographic photosensitive member 75 | 15 | 37 | 95 | 85 | 0.33 | 0.96 |
| Electrophotographic photosensitive member 76 | 15 | 100 | 78 | 25 | 0.34 | 0.98 |
| Electrophotographic photosensitive member 77 | 15 | 100 | 90 | 95 | 0.33 | 0.97 |
| Electrophotographic photosensitive member 78 | 15 | 100 | 78 | 50 | 0.34 | 0.97 |
| Electrophotographic photosensitive member 79 | 15 | 100 | 78 | 83 | 0.34 | 0.97 |
| Electrophotographic photosensitive member 80 | 15 | 100 | 83 | 85 | 0.33 | 0.97 |
| Electrophotographic photosensitive member 81 | 15 | 124 | 97 | 83 | 0..35 | 0.97 |
| Electrophotographic photosensitive member 82 | 15 | 124 | 97 | 28 | 0.35 | 0.97 |
| Electrophotographic photosensitive member 83 | 15 | 124 | 82 | 83 | 0.35 | 0.97 |
| Electrophotographic photosensitive member 84 | 15 | 124 | 82 | 28 | 0.35 | 0.97 |
| Electrophotographic photosensitive member 85 | 15 | 124 | 88 | 83 | 0..35 | 0.96 |
| Electrophotographic photosensitive member 86 | 15 | 124 | 88 | 28 | 0..35 | 0.96 |
| Electrophotographic photosensitive member 87 | 15 | 124 | 90 | 83 | 0.35 | 0.96 |
| Electrophotographic photosensitive member 88 | 15 | 124 | 90 | 28 | 0.35 | 0.96 |

TABLE 7-continued

| | Young's modulus of particle surface [GPa] | Volume average particle diameter/number average particle diameter of particle | Ash content during sintering of insoluble matter in surface layer with respect to methyl ethyl ketone [% by weight] |
|---|---|---|---|
| Electrophotographic photosensitive member 74 | 80 | 1.1 | 2.0 |
| Electrophotographic photosensitive member 75 | 80 | 1.5 | 2.0 |
| Electrophotographic photosensitive member 76 | 1.6 | 1.5 | 2.0 |
| Electrophotographic photosensitive member 77 | 80 | 1.1 | 2.0 |
| Electrophotographic photosensitive member 78 | 80 | 1.1 | 2.0 |
| Electrophotographic photosensitive member 79 | 80 | 1.1 | 2.0 |
| Electrophotographic photosensitive member 80 | 80 | 1.1 | 2.0 |
| Electrophotographic photosensitive member 81 | 80 | 1.1 | 2.0 |
| Electrophotographic photosensitive member 82 | 80 | 1.1 | 2.0 |
| Electrophotographic photosensitive member 83 | 80 | 1.1 | 2.0 |
| Electrophotographic photosensitive member 84 | 80 | 1.1 | 2.0 |
| Electrophotographic photosensitive member 85 | 80 | 1.1 | 2.0 |
| Electrophotographic photosensitive member 86 | 80 | 1.1 | 2.0 |
| Electrophotographic photosensitive member 87 | 80 | 1.1 | 2.0 |
| Electrophotographic photosensitive member 88 | 80 | 1.1 | 2.0 |

Production Examples 89 to 103 of Electrophotographic Photosensitive Member

Electrophotographic photosensitive members 89 to 103 were each produced in the same manner as in the production example of the electrophotographic photosensitive member 37, except that the temperature at which the coating liquid 37 for a charge transport layer was applied onto the charge generating layer 37 by dip coating to form a coat and dried, and in the fabrication example 2 of the surface layer containing a particle, the type and addition amount of the particle contained in the surface layer, and an addition amount of cyclohexane and 1-propanol were changed as shown in Table 8. The physical properties of the electrophotographic photosensitive members 89 to 103 were each measured. The results are shown in Table 9.

TABLE 8

| | Charge transport layer Drying temperature [° C.] | Particle | | Dispersion medium | | | |
|---|---|---|---|---|---|---|---|
| | | Type | Addition amount (parts by mass) | Type 1 | Addition amount | Type 2 | Addition amount |
| Electrophotographic photosensitive member 89 | 120 | Particle 3 | 1.2 | 1-Propanol | 78 | Cyclohexane | 22 |
| Electrophotographic photosensitive member 90 | 120 | Particle 4 | 1.2 | 1-Propanol | 78 | Cyclohexane | 22 |
| Electrophotographic photosensitive member 91 | 120 | Particle 9 | 1.2 | 1-Propanol | 78 | Cyclohexane | 22 |
| Electrophotographic photosensitive member 92 | 120 | Particle 1 | 1.2 | 1-Propanol | 90 | Cyclohexane | 10 |
| Electrophotographic photosensitive member 93 | 120 | Particle 1 | 1.2 | 1-Propanol | 90 | Cyclohexane | 10 |
| Electrophotographic photosensitive member 94 | 120 | Particle 1 | 1.2 | 1-Propanol | 90 | Cyclohexane | 10 |
| Electrophotographic photosensitive member 95 | 120 | Particle 1 | 1.2 | 1-Propanol | 90 | Cyclohexane | 10 |
| Electrophotographic photosensitive member 96 | 120 | Surface-treated particle 1 | 1.2 | 1-Propanol | 70 | Cyclohexane | 30 |
| Electrophotographic photosensitive member 97 | 120 | Surface-treated particle 1 | 1.2 | 1-Propanol | 70 | Cyclohexane | 30 |
| Electrophotographic photosensitive member 98 | 120 | Particle 1 | 1.2 | 1-Propanol | 70 | Cyclohexanone | 30 |
| Electrophotographic photosensitive member 99 | 120 | Particle 1 | 1.2 | 1-Propanol | 70 | Cyclohexanone | 30 |
| Electrophotographic photosensitive member 100 | 120 | Particle 1 | 1.2 | 1-Propanol | 40 | Cyclohexanone | 60 |
| Electrophotographic photosensitive member 101 | 120 | Particle 1 | 1.2 | 1-Propanol | 40 | Cyclohexanone | 60 |
| Electrophotographic photosensitive member 102 | 120 | Particle 1 | 1.2 | 1-Propanol | 70 | Cyclohexanone | 30 |
| Electrophotographic photosensitive member 103 | 120 | Particle 1 | 1.2 | 1-Propanol | 70 | Cyclohexanone | 30 |

TABLE 9

| | Film thickness of charge transport layer [μm] | Film thickness of surface layer [μm] | Volume average particle diameter of particle contained in surface layer [nm] |
|---|---|---|---|
| Electrophotographic photosensitive member 89 | 15 | 1 | 550 |
| Electrophotographic photosensitive member 90 | 15 | 1 | 37 |
| Electrophotographic photosensitive member 91 | 15 | 1 | 100 |
| Electrophotographic photosensitive member 92 | 15 | 1 | 100 |
| Electrophotographic photosensitive member 93 | 15 | 1 | 100 |
| Electrophotographic photosensitive member 94 | 15 | 1 | 100 |
| Electrophotographic photosensitive member 95 | 15 | 1 | 100 |
| Electrophotographic photosensitive member 96 | 15 | 1 | 124 |
| Electrophotographic photosensitive member 97 | 15 | 1 | 124 |
| Electrophotographic photosensitive member 98 | 15 | 1 | 124 |
| Electrophotographic photosensitive member 99 | 15 | 1 | 124 |
| Electrophotographic photosensitive member 100 | 15 | 1 | 124 |
| Electrophotographic photosensitive member 101 | 15 | 1 | 124 |
| Electrophotographic photosensitive member 102 | 15 | 1 | 124 |
| Electrophotographic photosensitive member 103 | 15 | 1 | 124 |
| Electrophotographic photosensitive member 104 | 15 | 0 | — |
| Electrophotographic photosensitive member 105 | 15 | 1 | — |
| Electrophotographic photosensitive member 106 | 15 | 0 | — |
| Electrophotographic photosensitive member 107 | 15 | 1 | 110 |
| Electrophotographic photosensitive member 108 | 15 | 0 | 4500 |

| | Ratio of number of particle exposed from surface layer [% by number] | Volume ratio of particle exposed from surface layer [% by number] | Coverage by particle S1/(S1 + S2) |
|---|---|---|---|
| Electrophotographic photosensitive member 89 | 95 | 25 | 0.32 |
| Electrophotographic photosensitive member 90 | 95 | 85 | 0.60 |
| Electrophotographic photosensitive member 91 | 78 | 25 | 0.23 |
| Electrophotographic photosensitive member 92 | 90 | 95 | 0.55 |
| Electrophotographic photosensitive member 93 | 78 | 50 | 0.24 |
| Electrophotographic photosensitive member 94 | 78 | 83 | 0.39 |
| Electrophotographic photosensitive member 95 | 83 | 85 | 0.45 |
| Electrophotographic photosensitive member 96 | 97 | 83 | 0.52 |
| Electrophotographic photosensitive member 97 | 97 | 28 | 0.31 |
| Electrophotographic photosensitive member 98 | 82 | 83 | 0.47 |
| Electrophotographic photosensitive member 99 | 82 | 28 | 0.23 |
| Electrophotographic photosensitive member 100 | 88 | 83 | 0.44 |
| Electrophotographic photosensitive member 101 | 88 | 28 | 0.22 |
| Electrophotographic photosensitive member 102 | 90 | 83 | 0.45 |
| Electrophotographic photosensitive member 103 | 90 | 28 | 0.28 |
| Electrophotographic photosensitive member 104 | 0 | 0 | — |
| Electrophotographic photosensitive member 105 | 0 | 0 | — |
| Electrophotographic photosensitive member 106 | 0 | 0 | — |
| Electrophotographic photosensitive member 107 | 10 | 5 | 0.17 |
| Electrophotographic photosensitive member 108 | 97 | 5 | 0.85 |

| | Average circularity of shape of exposed portion of particle | Young's modulus of particle surface [GPa] | Volume average particle diameter/number average particle diameter of particle | Ash content during sintering of insoluble matter in surface layer with respect to methyl ethyl ketone [% by weight] | Content ratio of particle contained in protective layer [% by volume] |
|---|---|---|---|---|---|
| Electrophotographic photosensitive member 89 | 0.96 | 80 | 1.1 | 2.0 | 50 |
| Electrophotographic photosensitive member 90 | 0.96 | 80 | 1.5 | 2.0 | 50 |
| Electrophotographic photosensitive member 91 | 0.98 | 1.6 | 1.5 | 2.0 | 50 |
| Electrophotographic photosensitive member 92 | 0.97 | 80 | 1.1 | 2.0 | 50 |
| Electrophotographic photosensitive member 93 | 0.97 | 80 | 1.1 | 2.0 | 50 |
| Electrophotographic photosensitive member 94 | 0.97 | 80 | 1.1 | 2.0 | 50 |
| Electrophotographic photosensitive member 95 | 0.97 | 80 | 1.1 | 2.0 | 50 |
| Electrophotographic photosensitive member 96 | 0.97 | 80 | 1.1 | 2.0 | 50 |
| Electrophotographic photosensitive member 97 | 0.97 | 80 | 1.1 | 2.0 | 50 |
| Electrophotographic photosensitive member 98 | 0.97 | 80 | 1.1 | 2.0 | 50 |
| Electrophotographic photosensitive member 99 | 0.97 | 80 | 1.1 | 2.0 | 50 |
| Electrophotographic photosensitive member 100 | 0.96 | 80 | 1.1 | 2.0 | 50 |
| Electrophotographic photosensitive member 101 | 0.96 | 80 | 1.1 | 2.0 | 50 |
| Electrophotographic photosensitive member 102 | 0.96 | 80 | 1.1 | 2.0 | 50 |
| Electrophotographic photosensitive member 103 | 0.96 | 80 | 1.1 | 2.0 | 50 |
| Electrophotographic photosensitive member 104 | — | — | — | 0.0 | — |
| Electrophotographic photosensitive member 105 | — | — | — | 0.0 | — |

TABLE 9-continued

| | | | | | |
|---|---|---|---|---|---|
| Electrophotographic photosensitive member 106 | — | — | — | 0.0 | — |
| Electrophotographic photosensitive member 107 | 0.98 | 50 | 1.8 | 11 | 80 |
| Electrophotographic photosensitive member 108 | 0.97 | 0.10 | 1.6 | 11 | 10 |

Production Example 104 of Electrophotographic Photosensitive Member

An electrophotographic photosensitive member 104 was produced in the same manner as in the production example of the electrophotographic photosensitive member 1, except that the drying temperature and drying time in the fabrication example 1 of the charge transport layer 1 were changed to 130° C. and 20 minutes, respectively. The physical properties of the electrophotographic photosensitive member 104 were each measured. The results are shown in Table 9.

Production Example 105 of Electrophotographic Photosensitive Member

An electrophotographic photosensitive member 105 was produced in the same manner as in the production example of the electrophotographic photosensitive member 37, except that the particle 1 was not added in (Fabrication Example 2 of Surface Layer Containing Particle). The physical properties of the electrophotographic photosensitive member 105 were each measured. The results are shown in Table 9.

Production Example 106 of Electrophotographic Photosensitive Member

An electrophotographic photosensitive member 106 was produced in the same manner as in the production example of the electrophotographic photosensitive member 73, except that the particle 1 was not added in (Fabrication Example 3 of Surface Layer Containing Particle). The physical properties of the electrophotographic photosensitive member 106 were each measured. The results are shown in Table 9.

Production Example 107 of Electrophotographic Photosensitive Member

An electrophotographic photosensitive member was produced in the same manner as in the production example of the electrophotographic photosensitive member 37 up to the fabrication example of the charge transport layer 2.

(Fabrication of Surface-treated Particle 2)

The following materials were added and dispersed at room temperature for 30 minutes by using a US homogenizer:

Metanol: 10 parts by mass

Tin oxide/barium sulfate (number average particle diameter: 100 nm) 5 parts by mass.

Next, 0.25 parts by mass of a side chain-type silicone surface treating agent having a silicone chain on the side chain of the silicone main chain ("KF9908", manufactured by Shin-Etsu Chemical Co., Ltd.), 0.25 parts by mass of a reactive surface treating agent (3-methacryloxypropyltrimethoxysilane ("KBM-503", manufactured by Shin-Etsu Chemical Co., Ltd.)), and 10 parts by mass of toluene were added, followed by stirring at room temperature for 60 minutes. After the solvent was removed by an evaporator, the resultant was heated at 120° C. for 60 minutes to fabricate a surface-treated particle 2, which had been surface-treated with the reactive surface treating agent. The particle had a volume average particle diameter of 200 nm and a number average particle diameter of 110 nm.

Then, the following materials were mixed to prepare a coating liquid 107 for a surface layer:

Radical polymerizable monomer (trimethylolpropane trimethacrylate): 120 parts by mass Surface-treated particle 2: 100 parts by mass Polymerization initiator (IRGACURE (registered trademark) 819, manufactured by BASF Japan Ltd.): 10 parts by mass 2-Butanol: 800 parts by mass Subsequently, the resulting coating liquid 107 for a surface layer was applied onto the charge transport layer 2 by dip coating to form a coat, and the coat was then irradiated with ultraviolet rays at 16 $mW/cm^2$ for one minute using a metal halide lamp (cumulative light quantity: 960 $mJ/cm^2$) to form surface layer having a dried film thickness of 1.0 μm, thereby preparing an electrophotographic photosensitive member 107. The physical properties of the electrophotographic photosensitive member 107 were each measured. The results are shown in Table 9.

Production Example 108 of Electrophotographic Photosensitive Member

First, 100 parts of monochlorobenzene, 10 parts of spherical polymethylsilsesquioxane particles (trade name: TOSPEARL 145, manufactured by Momentive Performance Materials Japan LLC, formerly known as Toshiba Silicone Co., Ltd.) having an average particle diameter of 4.5 μm, which are organic-inorganic hybrid particles, were put in a paint shaker and dispersed for 3 hours, thereby obtaining a coating liquid 108 for a surface layer.

The coating liquid 1 for a charge transport layer in Production Example 1 of the electrophotographic photosensitive member and the coating liquid 108 for a surface layer were mixed with stirring to prepare a coating liquid 108 for a charge transport layer. The coating liquid 108 for a charge transport layer was applied onto the charge generating layer 1 by dip coating, and the resulting coat was dried at 120° C. for an hour, thereby forming charge transport layer 108 having a film thickness of 16 μm. Next, the surface of the charge transport layer 108 was treated with a hydrofluoric acid solution having a concentration of 20% by mass, thereby obtaining an electrophotographic photosensitive member 108 in which the charge transport layer was the surface layer.

When observed with a scanning electron microscope (SEM), the particle was bound to the charge transport layer before the hydrofluoric acid treatment, whereas the particle was not bound to the charge transport layer after the hydrofluoric acid treatment, and there were many gaps between the particle and the inner surface of the pores of the charge transport layer 108. The physical properties of the electrophotographic photosensitive member 108 were each measured. The results are shown in Table 9.

Production Example of Toner Particle 1

(Preparation of Aqueous Medium 1)

First, 650.0 parts of ion exchanged water and 14.0 parts of sodium phosphate (manufactured by Rasa Industries, Ltd., 12 hydrates) were put into a reaction container equipped with a stirrer, a thermometer, and a reflux pipe and were kept at 65° C. for 1.0 hour under nitrogen purging.

An aqueous solution of calcium chloride in which 9.2 parts of calcium chloride (2 hydrates) dissolved in 10.0 parts of ion exchanged water was put into the reaction container all at once with stirring at 15,000 rpm by using a T.K. HOMO MIXER (manufactured by PRIMIX Corporation, formerly known as Tokushu Kika Kogyo Co., Ltd.) to prepare an aqueous medium containing a dispersion stabilizer. Further, 10% by mass of hydrochloric acid was put into the aqueous medium to adjust the pH to 5.0, thereby obtaining an aqueous medium 1.

(Preparation of Polymerizable Monomer Composition)

The following materials were put into an attritor (manufactured by Nippon Coke & Engineering Co., Ltd., formerly known as Mitsui Miike Kakoki Co., Ltd.):

Styrene: 60.0 parts

C.I. Pigment Blue 15:3: 6.5 parts

Those materials were dispersed at 220 rpm for 5.0 hours with a zirconia particle having a diameter of 1.7 mm, and then zirconia particle was removed to prepare a colorant dispersion.

On the other hand, the following materials were added to the above colorant dispersion:

Styrene: 20.0 parts n-Butyl acrylate: 20.0 parts

Crosslinking agent (divinylbenzene): 0.3 parts

Saturated polyester resin: 5.0 parts (polycondensation product (molar ratio of 10:12) of propylene-oxide modified bisphenol A (2-mole adduct) and terephthalic acid, glass transition temperature (Tg): 68° C., weight average molecular weight (Mw): 10,000, molecular weight distribution (Mw/Mn): 5.12)

Fischer-Tropsch wax (melting point 78° C.): 7.0 parts

The mixture was heated to 65° C. and then uniformly dissolved and dispersed at 500 rpm by using the T.K. HOMO MIXER (manufactured by PRIMIX Corporation, formerly known as Tokushu Kika Kogyo Co., Ltd.) to prepare a polymerizable monomer composition.

(Granulation Step)

After adjusting a temperature of the aqueous medium 1 to 70° C., the polymerizable monomer composition was put into the aqueous medium 1 while keeping a rotation speed of the T.K. HOMO MIXER at 15,000 rpm, and 10.0 parts of t-butyl peroxypivalate serving as a polymerization initiator was added thereto. Granulation is performed as it is for 10 minutes while the stirrer was maintained at 15,000 rpm.

(Polymerization Step and Distillation Step)

After the granulation step, the stirrer was replaced with a propeller stirring blade, the polymerization was carried out by holding at 70° C. for 5.0 hours with stirring at 150 rpm, and then the temperature was raised to 85° C. to further carry out the polymerization. Thereafter, the reflux pipe of the reaction container was replaced with a cooling pipe, and a resulting slurry was heated to 100° C. to distill the slurry for 6 hours and remove the unreacted polymerizable monomer through the distillation, thereby obtaining a resin particle dispersion.

Production Example of External Additive 1

An external additive 1 was produced as follows.

First, 150 parts of 5% ammonia water was poured into a 1.5 L glass reaction container equipped with a stirrer, a dripping nozzle, and a thermometer to make an alkaline catalyst solution. The alkaline catalyst solution was adjusted to 50° C., then stirred as 100 parts of tetraethoxysilane and 50 parts of 5% ammonia water were simultaneously added dropwise, and reacted for 8 hours to obtain a silica fine particle dispersion. Thereafter, the resulting silica fine particle dispersion was dried by spray drying and crushed with a pin mill to obtain a silica fine particle. Here, an external additive 1 having a different number average particle diameter R of a primary particle was obtained by appropriately changing the above production conditions.

Production Example of Toner 1

First, 100.00 parts of the toner particle 1 and 1.00 part of the external additive 1 were put into a Henschel mixer (manufactured by Nippon Coke & Engineering Co., Ltd., FM10C) with 7° C. water in a jacket. Once the water temperature in the jacket had stabilized at 7° C.±1° C., this was mixed for 10 minutes at a peripheral speed of 38 m/sec for the rotating blade. The amount of water passing through the jacket was adjusted appropriately during the mixing so that the temperature inside the Henschel mixer tank did not exceed 25° C. The resulting mixture was sieved with a 75 μm mesh to obtain a toner 1.

Production Example of Toner 2

The following materials were stirred and mixed with a common stirring apparatus:

Polymerizable monomer: 74 parts of styrene and 26 parts of n-butyl acrylate

Colorant: 7 parts of carbon black (trade name: #25B, manufactured by Mitsubishi Chemical Corporation)

Crosslinking agent: 0.74 parts of divinylbenzene

Charge control agent: 0.37 parts of styrene/an acrylic resin (trade name: FCA-592P, manufactured by Fujikura Kasei Co., Ltd.)

Molecular weight modifier: 1 part of tetraethylthiuram disulfide

Macromonomer: 0.25 parts of polymethacrylic acid ester macromonomer (trade name: AA6, manufactured by Toagosei Chemical Industry Co., Ltd., glass transition temperature Tg=94° C.)

After that, the components were uniformly dispersed with a media type disperser and heated to 63° C.

Then, 20 parts of the wax A-1 was added to the uniformly dispersed material, mixed, and dissolved therein to obtain a polymerizable monomer composition.

Separately, an aqueous solution obtained by dissolving 4.1 parts of sodium hydroxide in 50 parts of ion exchanged water was gradually added under stirring to an aqueous solution obtained by dissolving 7.4 parts of magnesium chloride in 250 parts of ion exchanged water in a stirring tank at room temperature to prepare a magnesium hydroxide colloidal dispersion (3.0 parts of magnesium hydroxide).

The above polymerizable monomer composition was put at room temperature into the magnesium hydroxide colloidal dispersion obtained as described above, the temperature was raised to 60° C., and the mixture was stirred until the droplets became stable. 5 parts of t-butylperoxy-2-ethylhexanoate (trade name: PERBUTYL O, manufactured by NOF Corp.) was added as a polymerization initiator thereto. Thereafter, an in-line emulsification disperser (trade name: MILDER, manufactured by Pacific Machinery & Engineering Co., Ltd.) was used to perform high-shear stirring at a rotation speed of 15,000 rpm and form droplets of a polymerizable monomer composition.

The magnesium hydroxide colloidal dispersion in which the droplets of the polymerizable monomer composition were dispersed was put into a reactor equipped with an impeller, the temperature was raised to 89° C. and controlled to be constant, and a polymerization reaction was performed. Subsequently, when the polymerization conversion rate reached 98%, the system temperature was lowered to 75° C., and 15 minutes after reaching 75° C., 3 parts of methyl methacrylate as a polymerizable monomer for the shell and 0.36 parts of 2,2'-azobis[2-methyl-N-(1,1-bis(hydroxymethyl)2-hydroxyethyl)propionamide]tetrahydrate (trade name: VA086, manufactured by FUJIFILM Wako Pure Chemical Corporation) dissolved in 10 parts of ion exchanged water were added. After the polymerization was further continued for 3 hours, the reaction was stopped to obtain an aqueous dispersion of a colored resin particle having a pH of 9.5.

Then, the aqueous dispersion of the colored resin particle was heated to 80° C., stripped at a nitrogen gas flow rate of 0.6 $m^3/(hr \cdot kg)$ for 5 hours, and then cooled to 25° C. Next, while stirring the resulting aqueous dispersion at 25° C., the system pH was adjusted to 6.5 or less with sulfuric acid to perform acid washing, water was separated by filtration, and then 500 parts of ion exchanged water was newly added to perform re-slurrying and washing with water. Thereafter, dehydration and water washing were repeated several times to separate the solid fraction by filtration, and the solid fraction was then placed in a drier and dried at 40° C. for 12 hours to obtain a toner particle 2.

To 100 parts of the toner particle obtained as described above, 0.7 parts of a hydrophobized silica fine particle having a number average primary particle diameter of 7 nm and 1 part of a hydrophobized silica fine particle having a number average primary particle diameter of 50 nm were added and mixed using a high-speed stirrer (trade name: FM Mixer, manufactured by Nippon Coke & Engineering Co., Ltd.) to produce a toner 2.

Example 1

The following evaluation was carried out by using the electrophotographic photosensitive member 1 and the toner 1. The evaluation results are shown in Tables 10-1 to 10-2.

<Evaluation Method>

<Evaluation of Transferability>

A modified version of a commercially available laser beam printer LBP7700C, manufactured by Canon Inc, was used. The modification was consisted of providing the developing roller with a rotation velocity of 360 mm/sec by changing the main unit of the evaluation apparatus and the software.

The toner was filled into a toner cartridge for the evaluation apparatus LBP7700C, and the toner cartridge was left for 24 hours in a normal-temperature, normal-humidity (25° C., 50% RH; hereinafter, also referred to as N/N) environment. After standing for 24 hours in this environment, the toner cartridge was installed in the aforementioned apparatus, and 500 prints of an image with a print percentage of 5.0% were printed out in the N/N environment in the crosswise direction at the center of A4 paper with a 50-mm margin on both the left and right. The paper used was plain paper CS-680 (68 $g/m^2$) (Canon Marketing Japan Inc.).

For evaluation, a solid image was output at the beginning of use (after the first print) and after 500 prints (after long-term use), and the untransferred toner on the photosensitive member during formation of the solid image was peeled off by taping using a transparent polyester adhesive tape.

A density difference was calculated by subtracting, from the density for the peeled-off adhesive tape pasted on paper, the density of only the adhesive tape pasted on paper. The density measurement was carried out at five locations to determine an arithmetic mean value thereof. This density difference value (referred to as a transfer residual density) was rated as follows. Note that the density was measured with an X-Rite color reflection densitometer (manufactured by X-Rite, Incorporated, X-Rite 500 Series).

(Evaluation Criteria)

A: Transfer residual density of less than 0.20

B: Transfer residual density of 0.20 or more and less than 0.50

C: Transfer residual density of 0.50 or more and less than 1.0

D: Transfer residual density of 1.0 or more

<Evaluation of Roughness>

A halftone (20H) image was formed after 10,000 sheets of character images having a printing rate of 1% were output by the modified machine in an environment of 30° C. and 80% RH to evaluate roughness (density uniformity) of the images based on the following criteria. The paper used was plain paper CS-680 (68 $g/m^2$) (Canon Marketing Japan Inc.). Note that the "20H of the image" is a value representing a halftone image when 256 gradation is expressed by hexadecimal numeral in which 00H represents solid white (non-image) and FFH represents solid black (full image).

The roughness was evaluated based on the following criteria. The density were measured at 20 locations, and the determination was made from a value of the density difference between the maximum and minimum values (referred to as density uniformity) as follows. Note that the density was measured with an X-Rite color reflection densitometer (manufactured by X-Rite, Incorporated, X-Rite 500 Series).

(Evaluation Criteria)

A: Density uniformity of less than 0.04

B: Density uniformity of 0.04 or more and less than 0.06

C: Density uniformity of 0.06 or more and less than 0.08

D: Density uniformity of 0.08 or more

<Evaluation of Durable Density Transition>

The density transition was evaluated through an durability test in an environment of 30° C. and 80% RH with a modified machine. An original image in which a 20-mm square solid black patch was arranged on 5 points in a development area was output, and a developing bias was set so that an initial reflection density was 1.3. Next, 10,000 sheets of character images having a printing rate of 1% were output. The paper used was plain paper CS-680 (68 $g/m^2$) (Canon Marketing Japan Inc.). The durability was evaluated through comparison of a difference in image density between a five-point average density of the solid black patch after the durability test and the initial image density.

Note that the image density was measured as a relative density with respect to an original image of a white portion by using "Macbeth Reflection Densitometer RD918" manufactured by Macbeth.

<Evaluation Criteria>

A: Density difference of less than 0.10

B: Density difference of 0.10 or more and less than 0.15

C: Density difference of 0.15 or more and less than 0.20

D: Density difference of 0.20 or more

Examples 2 to 72

The evaluation was carried out in the same manner as in Example 1 with the combination of the electrophotographic photosensitive member and the toner as shown in Table 4. The evaluation results are shown in Tables 10-1 and 10-2.

Comparative Examples 1 to 32, 34, and 35

The evaluation was carried out in the same evaluation method as in Example 1 with the combination of the electrophotographic photosensitive member and the toner as shown in Table 4. The evaluation results are shown in Tables 10-1 and 10-2.

Example 73

The evaluation was carried out in the same manner as in Examples 1 by using the electrophotographic photosensitive member 73 and the toner 2 with the following electrophotographic apparatus. The evaluation results are shown in Tables 10-1 and 10-2.

A monochrome laser printer HL-5200 manufactured by Brother Industries, Ltd. was modified as an electrophotographic apparatus. A high voltage power supply control system (Model 615-3, manufactured by TREK INCORPORATED) was used as the power supply for supplying power to the corona charger from outside the printer. The system was adjusted so that the amount of current flowing in a corona wire of the corona charger was 500 μA.

The toner in the toner cartridge for this printer was removed and filled with the toner 2 in its place. Further, the electrophotographic photosensitive member of the drum unit was removed, and instead, the electrophotographic photosensitive member 73 whose initial film thickness had been measured was set for durability evaluation.

Comparative Example 33

The evaluation was carried out in the same manner as in Example 73 by using the electrophotographic photosensitive member 106 and the toner 2. The evaluation results are shown in Tables 10-1 and 10-2.

TABLE 10-1

| | | | Evaluation method 1 | | Evaluation method 2 | | Evaluation method 3 | |
|---|---|---|---|---|---|---|---|---|
| | Electrophotographic photosensitive member | Toner | Transferability | Transfer residual density | Halftone roughness | Density uniformity | Decrease in density during durability testing | Density difference between initial and after 10,000 prints |
| Example 1 | Electrophotographic photosensitive member 1 | Toner 1 | A | 0.13 | A | 0.03 | A | 0.07 |
| Example 2 | Electrophotographic photosensitive member 2 | Toner 1 | A | 0.15 | A | 0.03 | A | 0.07 |
| Example 3 | Electrophotographic photosensitive member 3 | Toner 1 | A | 0.17 | C | 0.07 | A | 0.05 |
| Example 4 | Electrophotographic photosensitive member 4 | Toner 1 | A | 0.16 | B | 0.05 | A | 0.06 |
| Example 5 | Electrophotographic photosensitive member 5 | Toner 1 | A | 0.15 | A | 0.03 | A | 0.06 |
| Example 6 | Electrophotographic photosensitive member 6 | Toner 1 | A | 0.16 | A | 0.03 | B | 0.13 |
| Example 7 | Electrophotographic photosensitive member 7 | Toner 1 | A | 0.18 | B | 0.05 | C | 0.15 |
| Example 8 | Electrophotographic photosensitive member 8 | Toner 1 | A | 0.17 | A | 0.03 | C | 0.18 |
| Example 9 | Electrophotographic photosensitive member 9 | Toner 1 | A | 0.16 | C | 0.06 | A | 0.06 |
| Example 10 | Electrophotographic photosensitive member 10 | Toner 1 | A | 0.16 | B | 0.05 | A | 0.05 |
| Example 11 | Electrophotographic photosensitive member 11 | Toner 1 | B | 0.35 | B | 0.05 | B | 0.13 |
| Example 12 | Electrophotographic photosensitive member 12 | Toner 1 | B | 0.40 | B | 0.04 | B | 0.14 |
| Example 13 | Electrophotographic photosensitive member 13 | Toner 1 | A | 0.15 | A | 0.02 | A | 0.05 |
| Example 14 | Electrophotographic photosensitive member 14 | Toner 1 | A | 0.14 | A | 0.02 | B | 0.11 |
| Example 15 | Electrophotographic photosensitive member 15 | Toner 1 | A | 0.15 | A | 0.02 | B | 0.13 |
| Example 16 | Electrophotographic photosensitive member 16 | Toner 1 | B | 0.30 | B | 0.05 | A | 0.05 |
| Example 17 | Electrophotographic photosensitive member 17 | Toner 1 | A | 0.15 | A | 0.03 | C | 0.15 |
| Example 18 | Electrophotographic photosensitive member 18 | Toner 1 | C | 0.60 | C | 0.07 | A | 0.08 |
| Example 19 | Electrophotographic photosensitive member 19 | Toner 1 | A | 0.16 | A | 0.03 | C | 0.16 |
| Example 20 | Electrophotographic photosensitive member 20 | Toner 1 | B | 0.50 | A | 0.02 | B | 0.13 |
| Example 21 | Electrophotographic photosensitive member 21 | Toner 1 | B | 0.40 | A | 0.02 | C | 0.16 |

TABLE 10-1-continued

| | Electrophotographic photosensitive member | Toner | Evaluation method 1 Transferability | Evaluation method 1 Transfer residual density | Evaluation method 2 Halftone roughness | Evaluation method 2 Density uniformity | Evaluation method 3 Decrease in density during durability testing | Evaluation method 3 Density difference between initial and after 10,000 prints |
|---|---|---|---|---|---|---|---|---|
| Example 22 | Electrophotographic photosensitive member 22 | Toner 1 | C | 0.90 | C | 0.07 | C | 0.18 |
| Example 23 | Electrophotographic photosensitive member 23 | Toner 1 | C | 0.80 | C | 0.07 | C | 0.18 |
| Example 24 | Electrophotographic photosensitive member 24 | Toner 1 | C | 0.70 | C | 0.06 | A | 0.06 |
| Example 25 | Electrophotographic photosensitive member 25 | Toner 1 | B | 0.40 | A | 0.02 | B | 0.13 |
| Example 26 | Electrophotographic photosensitive member 26 | Toner 1 | A | 0.15 | A | 0.02 | A | 0.05 |
| Example 27 | Electrophotographic photosensitive member 27 | Toner 1 | A | 0.16 | C | 0.06 | A | 0.06 |
| Example 28 | Electrophotographic photosensitive member 28 | Toner 1 | B | 0.30 | A | 0.02 | B | 0.13 |
| Example 29 | Electrophotographic photosensitive member 29 | Toner 1 | B | 0.40 | B | 0.05 | B | 0.13 |
| Example 30 | Electrophotographic photosensitive member 30 | Toner 1 | C | 0.70 | C | 0.07 | C | 0.18 |
| Example 31 | Electrophotographic photosensitive member 31 | Toner 1 | C | 0.60 | B | 0.05 | C | 0.17 |
| Example 32 | Electrophotographic photosensitive member 32 | Toner 1 | A | 0.20 | B | 0.05 | B | 0.13 |
| Example 33 | Electrophotographic photosensitive member 33 | Toner 1 | A | 0.15 | B | 0.05 | B | 0.13 |
| Example 34 | Electrophotographic photosensitive member 34 | Toner 1 | A | 0.20 | C | 0.07 | A | 0.05 |
| Example 35 | Electrophotographic photosensitive member 35 | Toner 1 | C | 0.60 | C | 0.07 | C | 0.17 |
| Example 36 | Electrophotographic photosensitive member 36 | Toner 1 | C | 0.60 | C | 0.07 | C | 0.17 |
| Example 37 | Electrophotographic photosensitive member 37 | Toner 1 | A | 0.13 | A | 0.03 | A | 0.05 |
| Example 38 | Electrophotographic photosensitive member 38 | Toner 1 | A | 0.15 | A | 0.03 | A | 0.05 |
| Example 39 | Electrophotographic photosensitive member 39 | Toner 1 | A | 0.17 | C | 0.07 | A | 0.03 |
| Example 40 | Electrophotographic photosensitive member 40 | Toner 1 | A | 0.16 | B | 0.05 | A | 0.04 |
| Example 41 | Electrophotographic photosensitive member 41 | Toner | A | 0.15 | A | 0.03 | A | 0.04 |
| Example 42 | Electrophotographic photosensitive member 42 | Toner 1 | A | 0.16 | A | 0.03 | B | 0.11 |
| Example 43 | Electrophotographic photosensitive member 43 | Toner 1 | A | 0.18 | B | 0.05 | B | 0.13 |
| Example 44 | Electrophotographic photosensitive member 44 | Toner 1 | A | 0.17 | A | 0.03 | C | 0.16 |
| Example 45 | Electrophotographic photosensitive member 45 | Toner 1 | A | 0.16 | C | 0.06 | A | 0.04 |
| Example 46 | Electrophotographic photosensitive member 46 | Toner 1 | A | 0.16 | B | 0.05 | A | 0.03 |
| Example 47 | Electrophotographic photosensitive member 47 | Toner 1 | B | 0.35 | B | 0.05 | B | 0.11 |
| Example 48 | Electrophotographic photosensitive member 48 | Toner 1 | B | 0.40 | B | 0.04 | B | 0.12 |
| Example 49 | Electrophotographic photosensitive member 49 | Toner 1 | A | 0.15 | A | 0.02 | A | 0.03 |
| Example 50 | Electrophotographic photosensitive member 50 | Toner 1 | A | 0.14 | A | 0.02 | A | 0.09 |
| Example 51 | Electrophotographic photosensitive member 51 | Toner 1 | A | 0.15 | A | 0.02 | B | 0.11 |
| Example 52 | Electrophotographic photosensitive member 52 | Toner 1 | B | 0.30 | B | 0.05 | A | 0.03 |
| Example 53 | Electrophotographic photosensitive member 53 | Toner 1 | A | 0.15 | A | 0.03 | B | 0.13 |
| Example 54 | Electrophotographic photosensitive member 54 | Toner 1 | C | 0.60 | C | 0.07 | A | 0.06 |
| Example 55 | Electrophotographic photosensitive member 55 | Toner 1 | A | 0.16 | A | 0.03 | C | 0.14 |

TABLE 10-2

| | Electrophotographic photosensitive member | Toner | Evaluation method 1: Transferability | Evaluation method 1: Transfer residual density | Evaluation method 2: Halftone roughness | Evaluation method 2: Density uniformity | Evaluation method 3: Decrease in density during durability testing | Evaluation method 3: Density difference between initial and after 10,000 prints |
|---|---|---|---|---|---|---|---|---|
| Example 56 | Electrophotographic photosensitive member 56 | Toner 1 | B | 0.50 | A | 0.02 | B | 0.11 |
| Example 57 | Electrophotographic photosensitive member 57 | Toner 1 | B | 0.40 | A | 0.02 | C | 0.14 |
| Example 58 | Electrophotographic photosensitive member 58 | Toner 1 | C | 0.90 | C | 0.07 | C | 0.16 |
| Example 59 | Electrophotographic photosensitive member 59 | Toner 1 | C | 0.80 | C | 0.07 | C | 0.16 |
| Example 60 | Electrophotographic photosensitive member 60 | Toner 1 | C | 0.70 | C | 0.06 | A | 0.04 |
| Example 61 | Electrophotographic photosensitive member 61 | Toner 1 | B | 0.40 | A | 0.02 | B | 0.11 |
| Example 62 | Electrophotographic photosensitive member 62 | Toner 1 | A | 0.15 | A | 0.02 | A | 0.03 |
| Example 63 | Electrophotographic photosensitive member 63 | Toner 1 | A | 0.16 | C | 0.06 | A | 0.04 |
| Example 64 | Electrophotographic photosensitive member 64 | Toner 1 | B | 0.30 | A | 0.02 | B | 0.11 |
| Example 65 | Electrophotographic photosensitive member 65 | Toner 1 | B | 0.40 | B | 0.05 | B | 0.11 |
| Example 66 | Electrophotographic photosensitive member 66 | Toner 1 | C | 0.70 | C | 0.07 | C | 0.16 |
| Example 67 | Electrophotographic photosensitive member 67 | Toner 1 | C | 0.60 | B | 0.05 | C | 0.15 |
| Example 68 | Electrophotographic photosensitive member 68 | Toner 1 | A | 0.20 | B | 0.05 | B | 0.11 |
| Example 69 | Electrophotographic photosensitive member 69 | Toner 1 | A | 0.15 | B | 0.05 | B | 0.11 |
| Example 70 | Electrophotographic photosensitive member 70 | Toner 1 | A | 0.20 | C | 0.07 | A | 0.03 |
| Example 71 | Electrophotographic photosensitive member 71 | Toner 1 | C | 0.60 | C | 0.0 | C | 0.15 |
| Example 72 | Electrophotographic photosensitive member 72 | Toner 1 | C | 0.60 | C | 0.07 | C | 0.15 |
| Example 73 | Electrophotographic photosensitive member 73 | Toner 2 | A | 0.15 | A | 0.02 | A | 0.06 |
| Comparative Example 1 | Electrophotographic photosensitive member 74 | Toner 1 | D | 1.20 | B | 0.05 | C | 0.17 |
| Comparative Example 2 | Electrophotographic photosensitive member 75 | Toner 1 | D | 1.20 | C | 0.07 | D | 0.21 |
| Comparative Example 3 | Electrophotographic photosensitive member 76 | Toner 1 | A | 0.20 | D | 0.09 | A | 0.05 |
| Comparative Example 4 | Electrophotographic photosensitive member 77 | Toner 1 | A | 0.15 | B | 0.05 | D | 0.25 |
| Comparative Example 5 | Electrophotographic photosensitive member 78 | Toner 1 | A | 0.20 | D | 0.09 | D | 0.25 |
| Comparative Example 6 | Electrophotographic photosensitive member 79 | Toner 1 | A | 0.15 | A | 0.02 | D | 0.25 |
| Comparative Example 7 | Electrophotographic photosensitive member 80 | Toner 1 | A | 0.20 | C | 0.07 | D | 0.25 |
| Comparative Example 8 | Electrophotographic photosensitive member 81 | Toner 1 | A | 0.15 | A | 0.03 | D | 0.3 |
| Comparative Example 9 | Electrophotographic photosensitive member 82 | Toner 1 | D | 1.20 | B | 0.05 | A | 0.08 |
| Comparative Example 10 | Electrophotographic photosensitive member 83 | Toner 1 | A | 0.15 | A | 0.03 | D | 0.25 |
| Comparative Example 11 | Electrophotographic photosensitive member 84 | Toner 1 | D | 1.20 | D | 0.09 | A | 0.06 |
| Comparative Example 12 | Electrophotographic photosensitive member 85 | Toner 1 | A | 0.16 | A | 0.03 | D | 0.25 |
| Comparative Example 13 | Electrophotographic photosensitive member 86 | Toner 1 | D | 1.20 | C | 0.07 | A | 0.06 |
| Comparative Example 14 | Electrophotographic photosensitive member 87 | Toner 1 | A | 0.18 | A | 0.03 | D | 0.25 |
| Comparative Example 15 | Electrophotographic photosensitive member 88 | Toner 1 | D | 1.20 | B | 0.05 | A | 0.06 |
| Comparative Example 16 | Electrophotographic photosensitive member 89 | Toner 1 | D | 1.20 | B | 0.05 | B | 0.12 |
| Comparative Example 17 | Electrophotographic photosensitive member 90 | Toner 1 | D | 1.20 | C | 0.07 | C | 0.16 |

TABLE 10-2-continued

| | Electrophotographic photosensitive member | Toner | Evaluation method 1 Transferability | Transfer residual density | Evaluation method 2 Halftone roughness | Density uniformity | Evaluation method 3 Decrease in density during durability testing | Density difference between initial and after 10,000 prints |
|---|---|---|---|---|---|---|---|---|
| Comparative Example 18 | Electrophotographic photosensitive member 91 | Toner 1 | A | 0.20 | D | 0.09 | A | 0.03 |
| Comparative Example 19 | Electrophotographic photosensitive member 92 | Toner 1 | A | 0.15 | B | 0.05 | D | 0.2 |
| Comparative Example 20 | Electrophotographic photosensitive member 93 | Toner 1 | A | 0.20 | D | 0.09 | D | 0.2 |
| Comparative Example 21 | Electrophotographic photosensitive member 94 | Toner 1 | A | 0.15 | A | 0.02 | D | 0.2 |
| Comparative Example 22 | Electrophotographic photosensitive member 95 | Toner 1 | A | 0.20 | C | 0.07 | D | 0.2 |
| Comparative Example 23 | Electrophotographic photosensitive member 96 | Toner 1 | A | 0.15 | A | 0.03 | D | 0.25 |
| Comparative Example 24 | Electrophotographic photosensitive member 97 | Toner 1 | D | 1.20 | B | 0.05 | A | 0.03 |
| Comparative Example 25 | Electrophotographic photosensitive member 98 | Toner 1 | A | 0.15 | A | 0.03 | D | 0.2 |
| Comparative Example 26 | Electrophotographic photosensitive member 99 | Toner 1 | D | 1.20 | D | 0.09 | A | 0.01 |
| Comparative Example 27 | Electrophotographic photosensitive member 100 | Toner 1 | A | 0.16 | A | 0.03 | D | 0.2 |
| Comparative Example 28 | Electrophotographic photosensitive member 101 | Toner 1 | D | 1.2 | C | 0.07 | A | 0.01 |
| Comparative Example 29 | Electrophotographic photosensitive member 102 | Toner 1 | A | 0.18 | A | 0.03 | D | 0.2 |
| Comparative Example 30 | Electrophotographic photosensitive member 103 | Toner 1 | D | 1.2 | B | 0.05 | A | 0.01 |
| Comparative Example 31 | Electrophotographic photosensitive member 104 | Toner 1 | D | 2.0 | C | 0.07 | B | 0.11 |
| Comparative Example 32 | Electrophotographic photosensitive member 105 | Toner 1 | D | 2.5 | C | 0.07 | B | 0.11 |
| Comparative Example 33 | Electrophotographic photosensitive member 106 | Toner 1 | D | 3.0 | C | 0.07 | B | 0.12 |
| Comparative Example 34 | Electrophotographic photosensitive member 107 | Toner 1 | C | 0.7 | D | 0.09 | A | 0.05 |
| Comparative Example 35 | Electrophotographic photosensitive member 108 | Toner 1 | D | 2.0 | D | 0.09 | D | 0.22 |

According to the present invention, the electrophotographic photosensitive member can achieve both improvement in image quality and improvement in transferability of a halftone image by suppressing light scattering in a surface layer of the photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electrophotographic photosensitive member comprising a support and a photosensitive layer on the support, wherein a surface layer of the electrophotographic photosensitive member contains a particle, the surface layer has a particle partially exposed from the surface layer among the particle contained in the surface layer, the particle has a volume average particle diameter of 50.0 nm or more and 350.0 nm or less;

in a cross-section of the surface layer, the number of the particle partially exposed from the surface layer is 80% by number or more based on a total number of the particle contained in the surface layer; and a total volume of an exposed portion of the particle partially exposed from the surface layer is 30% by volume or more and 80% by volume or less based on an entire volume of the particle contained in the surface layer.

2. The electrophotographic photosensitive member according to claim 1, wherein the photosensitive layer has a charge generating layer and a charge transport layer on the charge generating layer, the charge transport layer being the surface layer.

3. The electrophotographic photosensitive member according to claim 1, wherein the photosensitive layer has a charge generating layer and a charge transport layer on the charge generating layer, and the electrophotographic photosensitive member further comprises a protective layer on the photosensitive layer, the protective layer being the surface layer.

4. The electrophotographic photosensitive member according to claim 1, wherein the photosensitive layer is a monolayered photosensitive layer, and the electrophotographic photosensitive member further comprises a protective layer on the photosensitive layer, the protective layer being the surface layer.

5. The electrophotographic photosensitive member according to claim 1, wherein S1(S1+S2) satisfies the following formula (A), where S1 is a total area of the exposed portion of the particle partially exposed from the surface layer, and S2 is a total area other than the exposed portion of the particle partially exposed from the surface layer, when the surface layer is viewed from above $$0.15 \leq S1/(S1+S2) \leq 0.80 \quad \text{Formula (A).}$$

6. The electrophotographic photosensitive member according to claim 5, wherein a coefficient of variation of S1(S1+S2) is 25% or less, where S1 is the total area of the exposed portion of the particle, and S2 is a total area other than the exposed portion of the particle, when the surface layer is viewed from above.

7. The electrophotographic photosensitive member according to claim 1, wherein when the surface layer is viewed from above, SF-2 of a shape of the exposed portion of the particle is 135 or less.

8. The electrophotographic photosensitive member according to claim 1, wherein when the surface layer is viewed from above, an average circularity of a shape of the exposed portion of the particle is 0.90 or more.

9. The electrophotographic photosensitive member according to claim 1, wherein the particle has a Young's modulus of 0.60 GPa or more.

10. The electrophotographic photosensitive member according to claim 1, wherein the particle has (a volume average particle diameter)/(number average particle diameter) of 1.5 or less.

11. The electrophotographic photosensitive member according to claim 1, wherein an ash content of insoluble methyl ethyl ketone in the surface layer during sintering is 5.0% by mass or less based on a total mass of the surface layer.

12. A process cartridge integrally supporting at least one unit selected from the group consisting of a charging unit and a developing unit, wherein the process cartridge is removably mountable on an electrophotographic apparatus, wherein the process cartridge comprises an electrophotographic photosensitive member, the electrophotographic photosensitive member comprises a support and a photosensitive layer on the support, a surface layer of the electrophotographic photosensitive member contains a particle, the surface layer has a particle partially exposed from the surface layer among the particle contained in the surface layer, the particle has a volume average particle diameter of 50.0 nm or more and 350.0 nm or less;

in a cross-section of the surface layer, the number of the particle partially exposed from the surface layer is 80% by number or more based on a total number of the particle contained in the surface layer; and a total volume of an exposed portion of the particle partially exposed from the surface layer is 30% by volume or more and 80% by volume or less based on an entire volume of the particle contained in the surface layer.

13. An electrophotographic apparatus comprising an electrophotographic photosensitive member, a charging unit, a developing unit, and a transfer unit, wherein the electrophotographic photosensitive member comprises a support and a photosensitive layer on the support, a surface layer of the electrophotographic photosensitive member contains a particle, the surface layer has a particle partially exposed from the surface layer among the particle contained in the surface layer, the particle has a volume average particle diameter of 50.0 nm or more and 350.0 nm or less;

in a cross-section of the surface layer, the number of the particle partially exposed from the surface layer is 80% by number or more based on a total number of the particle contained in the surface layer; and a total volume of an exposed portion of the particle partially exposed from the surface layer is 30% by volume or more and 80% by volume or less based on an entire volume of the particle contained in the surface layer.

* * * * *